(12) United States Patent
Morton et al.

(10) Patent No.: US 12,714,539 B2
(45) Date of Patent: Aug. 25, 2026

(54) SYSTEMS, METHODS, AND DEVICES FOR PREDICTABLE ORTHODONTIC TREATMENT

(71) Applicant: Align Technology, Inc., San Jose, CA (US)

(72) Inventors: John Morton, San Jose, CA (US); James Nishimuta, Durham, NC (US)

(73) Assignee: Align Technology, Inc., San Jose, CA (US)

( * ) Notice: Subject to any disclaimer, the term of this patent is extended or adjusted under 35 U.S.C. 154(b) by 0 days.

(21) Appl. No.: 15/470,403

(22) Filed: Mar. 27, 2017

(65) Prior Publication Data

US 2017/0273760 A1 Sep. 28, 2017

Related U.S. Application Data

(63) Continuation of application No. PCT/US2017/024141, filed on Mar. 24, 2017.

(60) Provisional application No. 62/314,317, filed on Mar. 28, 2016.

(51) Int. Cl.
*A61C 7/08* (2006.01)
*A61C 7/00* (2006.01)

(52) U.S. Cl.
CPC ................ *A61C 7/08* (2013.01); *A61C 7/002* (2013.01)

(58) Field of Classification Search
CPC ................................. A61C 7/08; A61C 7/002
See application file for complete search history.

(56) References Cited

U.S. PATENT DOCUMENTS

| | | | |
|---|---|---|---|
| 2,467,432 | A | 4/1949 | Kesling |
| 3,407,500 | A | 10/1968 | Kesling |
| 3,600,808 | A | 8/1971 | Reeve |
| 3,660,900 | A | 5/1972 | Andrews |
| 3,683,502 | A | 8/1972 | Wallshein |
| 3,738,005 | A | 6/1973 | Cohen et al. |

(Continued)

FOREIGN PATENT DOCUMENTS

| | | | |
|---|---|---|---|
| AU | 3031677 | A | 5/1979 |
| AU | 517102 | B2 | 7/1981 |

(Continued)

OTHER PUBLICATIONS

Specification and Drawings for U.S. Appl. No. 62/238,560 (Year: 2015).*

(Continued)

*Primary Examiner* — Heidi M Eide
(74) *Attorney, Agent, or Firm* — FisherBroyles, LLP

(57) ABSTRACT

A system for generating a treatment plan for repositioning a plurality of teeth comprises instructions to receive a digital data set representing the plurality of teeth, and determine a movement trajectory for repositioning, each tooth from an initial position and orientation towards a target position and orientation. The movement trajectory of at least one tooth comprises movement along a plurality of different directions. A movement velocity is determined for repositioning each tooth along the corresponding movement trajectory. The movement velocity is determined independently for each tooth, and the movement velocity for the at least one tooth is determined independently for each direction.

16 Claims, 19 Drawing Sheets

(56) References Cited

U.S. PATENT DOCUMENTS 3,860,803 A 1/1975 Levine
3,916,526 A 11/1975 Schudy
3,922,786 A 12/1975 Lavin
3,950,851 A 4/1976 Bergersen
3,983,628 A 10/1976 Acevedo
4,014,096 A 3/1977 Dellinger
4,195,046 A 3/1980 Kesling
4,253,828 A 3/1981 Coles et al.
4,324,546 A 4/1982 Heitlinger et al.
4,324,547 A 4/1982 Arcan et al.
4,348,178 A 9/1982 Kurz
4,478,580 A 10/1984 Barrut
4,500,294 A 2/1985 Lewis
4,504,225 A 3/1985 Yoshii
4,505,673 A 3/1985 Yoshii
4,526,540 A 7/1985 Dellinger
4,575,330 A 3/1986 Hull
4,575,805 A 3/1986 Moermann et al.
4,591,341 A 5/1986 Andrews
4,609,349 A 9/1986 Cain
4,611,288 A 9/1986 Duret et al.
4,656,860 A 4/1987 Orthuber et al.
4,663,720 A 5/1987 Duret et al.
4,664,626 A 5/1987 Kesling
4,676,747 A 6/1987 Kesling
4,742,464 A 5/1988 Duret et al.
4,755,139 A 7/1988 Abbatte et al.
4,763,791 A 8/1988 Halverson et al.
4,793,803 A 12/1988 Martz
4,798,534 A 1/1989 Breads
4,836,778 A 6/1989 Baumrind et al.
4,837,732 A 6/1989 Brandestini et al.
4,850,864 A 7/1989 Diamond
4,850,865 A 7/1989 Napolitano
4,856,991 A 8/1989 Breads et al.
4,877,398 A 10/1989 Kesling
4,880,380 A 11/1989 Martz
4,889,238 A 12/1989 Batchelor
4,890,608 A 1/1990 Steer
4,935,635 A 6/1990 O'Harra
4,936,862 A 6/1990 Walker et al.
4,937,928 A 7/1990 van der Zel
4,941,826 A 7/1990 Loran et al.
4,964,770 A 10/1990 Steinbichler et al.
4,975,052 A 12/1990 Spencer et al.
4,983,334 A 1/1991 Adell
5,011,405 A 4/1991 Lemchen
5,017,133 A 5/1991 Miura
5,027,281 A 6/1991 Rekow et al.
5,035,613 A 7/1991 Breads et al.
5,055,039 A 10/1991 Abbatte et al.
5,059,118 A 10/1991 Breads et al.
5,100,316 A 3/1992 Wildman
5,121,333 A 6/1992 Riley et al.
5,125,832 A 6/1992 Kesling
5,128,870 A 7/1992 Erdman et al.
5,130,064 A 7/1992 Smalley et al.
5,131,843 A 7/1992 Hilgers et al.
5,131,844 A 7/1992 Marinaccio et al.
5,139,419 A 8/1992 Andreiko et al.
5,145,364 A 9/1992 Martz et al.
5,176,517 A 1/1993 Truax
5,184,306 A 2/1993 Erdman et al.
5,186,623 A 2/1993 Breads et al.
5,257,203 A 10/1993 Riley et al.
5,273,429 A 12/1993 Rekow et al.
5,278,756 A 1/1994 Lemchen et al.
5,328,362 A 7/1994 Watson et al.
5,338,198 A 8/1994 Wu et al.
5,340,309 A 8/1994 Robertson
5,342,202 A 8/1994 Deshayes
5,368,478 A 11/1994 Andreiko et al.
5,382,164 A 1/1995 Stern
5,395,238 A 3/1995 Andreiko et al.
5,431,562 A 7/1995 Andreiko et al.
5,440,326 A 8/1995 Quinn
5,440,496 A 8/1995 Andersson et al.
5,447,432 A 9/1995 Andreiko et al.
5,452,219 A 9/1995 Dehoff et al.
5,454,717 A 10/1995 Andreiko et al.
5,456,600 A 10/1995 Andreiko et al.
5,474,448 A 12/1995 Andreiko et al.
RE35,169 E 3/1996 Lemchen et al.
5,518,397 A 5/1996 Andreiko et al.
5,528,735 A 6/1996 Strasnick et al.
5,533,895 A 7/1996 Andreiko et al.
5,542,842 A 8/1996 Andreiko et al.
5,549,476 A 8/1996 Stern
5,562,448 A 10/1996 Mushabac
5,587,912 A 12/1996 Andersson et al.
5,605,459 A 2/1997 Kuroda et al.
5,607,305 A 3/1997 Andersson et al.
5,614,075 A 3/1997 Andre, Sr.
5,621,648 A 4/1997 Crump
5,645,420 A 7/1997 Bergersen
5,645,421 A 7/1997 Slootsky
5,655,653 A 8/1997 Chester
5,683,243 A 11/1997 Andreiko et al.
5,692,894 A 12/1997 Schwartz et al.
5,725,376 A 3/1998 Poirier
5,725,378 A 3/1998 Wang
5,733,126 A 3/1998 Andersson et al.
5,740,267 A 4/1998 Echerer et al.
5,742,700 A 4/1998 Yoon et al.
5,799,100 A 8/1998 Clarke et al.
5,800,174 A 9/1998 Andersson
5,823,778 A 10/1998 Schmitt et al.
5,848,115 A 12/1998 Little et al.
5,857,853 A 1/1999 van Nifterick et al.
5,866,058 A 2/1999 Batchelder et al.
5,879,158 A 3/1999 Doyle et al.
5,880,961 A 3/1999 Crump
5,880,962 A 3/1999 Andersson et al.
5,934,288 A 8/1999 Avila et al.
5,957,686 A 9/1999 Anthony
5,964,587 A 10/1999 Sato
5,971,754 A 10/1999 Sondhi et al.
5,975,893 A 11/1999 Chishti et al.
6,015,289 A 1/2000 Andreiko et al.
6,044,309 A 3/2000 Honda
6,049,743 A 4/2000 Baba
6,062,861 A 5/2000 Andersson
6,068,482 A 5/2000 Snow
6,099,314 A 8/2000 Kopelman et al.
6,123,544 A 9/2000 Cleary
6,152,731 A 11/2000 Jordan et al.
6,183,248 B1 2/2001 Chishti et al.
6,190,165 B1 2/2001 Andreiko et al.
6,217,325 B1 4/2001 Chishti et al.
6,217,334 B1 4/2001 Hultgren
6,244,861 B1 6/2001 Andreiko et al.
6,299,440 B1 * 10/2001 Phan ........................ A61C 7/08 433/18
6,309,215 B1 10/2001 Phan et al.
6,315,553 B1 11/2001 Sachdeva et al.
6,318,994 B1 * 11/2001 Chishti .................... A61C 7/00 433/213
6,322,359 B1 11/2001 Jordan et al.
6,350,120 B1 2/2002 Sachdeva et al.
6,382,975 B1 5/2002 Poirier
6,398,548 B1 6/2002 Muhammad et al.
6,402,707 B1 6/2002 Ernst
6,457,972 B1 * 10/2002 Chishti ................... G06F 30/20 433/24
6,482,298 B1 11/2002 Bhatnagar
6,524,101 B1 2/2003 Phan et al.
6,554,611 B2 4/2003 Shishti et al.
6,572,372 B1 6/2003 Phan et al.
6,602,070 B2 * 8/2003 Miller .................... G16H 50/50 433/24
6,629,840 B2 10/2003 Chishti et al.
6,705,863 B2 3/2004 Phan et al.
6,722,880 B2 4/2004 Chishti et al.
6,845,175 B2 1/2005 Kopelman et al.

(56) References Cited

U.S. PATENT DOCUMENTS

| | | | | |
|---|---|---|---|---|
| 8,038,444 | B2 | 10/2011 | Kitching et al. | |
| 9,326,830 | B2 | 5/2016 | Kitching et al. | |
| 2001/0002310 | A1* | 5/2001 | Chishti | A61C 7/08 345/20 |
| 2002/0006597 | A1 | 1/2002 | Andreiko et al. | |
| 2002/0009686 | A1* | 1/2002 | Loc | A61C 7/00 433/24 |
| 2002/0064746 | A1* | 5/2002 | Muhammad | A61C 7/00 433/24 |
| 2003/0009252 | A1 | 1/2003 | Pavlovskaia et al. | |
| 2003/0139834 | A1 | 7/2003 | Nikolskiy et al. | |
| 2003/0224311 | A1 | 12/2003 | Cronauer | |
| 2004/0128010 | A1 | 7/2004 | Pavlovskaia et al. | |
| 2004/0137400 | A1* | 7/2004 | Chishti | A61C 7/00 433/24 |
| 2005/0055118 | A1 | 3/2005 | Nikolskiy et al. | |
| 2006/0223022 | A1* | 10/2006 | Solomon | A61C 7/08 433/8 |
| 2007/0168152 | A1* | 7/2007 | Matov | A61C 7/00 702/155 |
| 2008/0057462 | A1* | 3/2008 | Kitching | A61C 7/00 433/24 |
| 2008/0182220 | A1 | 7/2008 | Chishti et al. | |
| 2008/0305453 | A1 | 12/2008 | Kitching et al. | |
| 2008/0306724 | A1 | 12/2008 | Kitching et al. | |
| 2009/0191503 | A1* | 7/2009 | Matov | A61C 7/00 433/24 |
| 2009/0291406 | A1* | 11/2009 | Namiranian | A61C 7/10 433/24 |
| 2010/0138025 | A1* | 6/2010 | Morton | A61C 7/00 700/104 |
| 2010/0151404 | A1* | 6/2010 | Wu | A61C 7/00 433/24 |
| 2012/0035901 | A1 | 2/2012 | Kitching et al. | |
| 2013/0323669 | A1* | 12/2013 | Lowe | A61C 7/00 433/24 |
| 2016/0135925 | A1* | 5/2016 | Mason | A61C 7/002 703/2 |
| 2016/0242870 | A1* | 8/2016 | Matov | A61C 7/002 |
| 2016/0242871 | A1* | 8/2016 | Morton | A61C 7/08 |
| 2017/0100208 | A1* | 4/2017 | Wen | G06F 30/00 |
| 2017/0231722 | A1* | 8/2017 | Boronkay | A61C 7/08 433/6 |

FOREIGN PATENT DOCUMENTS

| | | | |
|---|---|---|---|
| AU | 5598894 | A | 6/1994 |
| CA | 1121955 | A | 4/1982 |
| CN | 1923326 | A | 3/2007 |
| CN | 101175452 | A | 5/2008 |
| CN | 103784202 | A | 5/2014 |
| CN | 103889364 | A | 6/2014 |
| CN | 104093375 | A | 10/2014 |
| CN | 105232163 | A | 1/2016 |
| CN | 105250044 | A | 1/2016 |
| CN | 105266905 | A | 1/2016 |
| DE | 2749802 | A1 | 5/1978 |
| DE | 69327661 | T2 | 7/2000 |
| EP | 0091876 | A1 | 10/1983 |
| EP | 0299490 | A2 | 1/1989 |
| EP | 0376873 | A2 | 7/1990 |
| EP | 0490848 | A2 | 6/1992 |
| EP | 0541500 | A1 | 5/1993 |
| EP | 0667753 | B1 | 1/2000 |
| EP | 0774933 | B1 | 12/2000 |
| EP | 0731673 | B1 | 5/2001 |
| ES | 463897 | A1 | 1/1980 |
| FR | 2369828 | A1 | 6/1978 |
| FR | 2652256 | A1 | 3/1991 |
| GB | 1550777 | A | 8/1979 |
| JP | S5358191 | A | 5/1978 |
| JP | H0428359 | A | 1/1992 |
| JP | H08508174 | A | 9/1996 |
| WO | WO-9008512 | A1 | 8/1990 |
| WO | WO-9104713 | A1 | 4/1991 |
| WO | WO-9410935 | A1 | 5/1994 |
| WO | WO-9832394 | A1 | 7/1998 |
| WO | WO-9844865 | A1 | 10/1998 |
| WO | WO-9858596 | A1 | 12/1998 |
| WO | 0180765 | A1 | 11/2001 |
| WO | WO-2017172537 | A1 | 10/2017 |

OTHER PUBLICATIONS

AADR. American Association for Dental Research, Summary of Activities, Mar. 20-23, 1980, Los Angeles, CA, p. 195.

Alcaniz, et al., "An Advanced System for the Simulation and Planning of Orthodontic Treatments," Karl Heinz Hohne and Ron Kikinis (eds.), Visualization in Biomedical Computing, 4th Intl. Conf., VBC '96, Hamburg, Germany, Sep. 22-25, 1996, Springer-Verlag, pp. 511-520.

Alexander et al., "The DigiGraph Work Station Part 2 Clinical Management," JCO, pp. 402-407 (Jul. 1990).

Altschuler, "3D Mapping of Maxillo-Facial Prosthesis," AADR Abstract #607, 2 pages total, (1980).

Altschuler et al., "Analysis of 3-D Data for Comparative 3-D Serial Growth Pattern Studies of Oral-Facial Structures," AADR Abstracts, Program and Abstracts of Papers, 57th General Session, IADR HP Annual Session, Mar. 29, 1979-Apr. 1, 1979, New Orleans Marriot, Journal of Dental Research, vol. 58, Jan. 1979, Special Issue A, p. 221.

Altschuler et al., "Laser Electro-Optic System for Rapid Three-Dimensional (3D) Topographic Mapping of Surfaces," Optical Engineering, 20(6): 953-961 (1981).

Altschuler et al., "Measuring Surfaces Space-Coded by a Laser-Projected Dot Matrix," SPIE Imaging Applications for Automated Industrial Inspection and Assembly, vol. 182, p. 187-191 (1979).

Andersson et al., "Clinical Results with Titanium Crowns Fabricated with Machine Duplication and Spark Erosion," Acta. Odontol. Scand., 47:279-286 (1989).

Andrews, The Six Keys to Optimal Occlusion Straight Wire, Chapter 3, pp. 13-24 (1989).

Bartels, et al., An Introduction to Splines for Use in Computer Graphics and Geometric Modeling, Morgan Kaufmann Publishers, pp. 422-425 (1987).

Baumrind, "A System for Craniofacial Mapping Through the Integration of Data from Stereo X-Ray Films and Stereo Photographs," an invited paper submitted to the 1975 American Society of Photogram Symposium on Close-Range Photogram Systems, University of Ill., Aug. 26-30, 1975, pp. 142-166.

Baumrind et al., "A Stereophotogrammetric System for the Detection of Prosthesis Loosening in Total Hip Arthroplasty," NATO Symposium on Applications of Human Biostereometrics, Jul. 9-13, 1978, SPIE, vol. 166, pp. 112-123.

Baumrind et al., "Mapping the Skull in 3-D," reprinted from J. Calif. Dent. Assoc., 48(2), 11 pages total, (1972 Fall Issue).

Baumrind, "Integrated Three-Dimensional Craniofacial Mapping: Background, Principles, and Perspectives," Semin. in Orthod., 7(4):223-232 (Dec. 2001).

Begole et al., "A Computer System for the Analysis of Dental Casts," The Angle Orthod., 51(3):253-259 (Jul. 1981).

Bernard et al.,"Computerized Diagnosis in Orthodontics for Epidemiological Studies: A Progress Report," Abstract, J. Dental Res. Special Issue, vol. 67, p. 169, paper presented at International Association for Dental Research 66th General Session, Mar. 9-13, 1988, Montreal, Canada.

Bhatia et al., "A Computer-Aided Design for Orthognathic Surgery," Br. J. Oral Maxillofac. Surg., 22:237-253 (1984).

Biggerstaff, "Computerized Diagnostic Setups and Simulations," Angle Orthod., 40(1):28-36 (Jan. 1970).

Biggerstaff et al., "Computerized Analysis of Occlusion in the Postcanine Dentition," Am. J. Orthod., 61(3): 245-254 (Mar. 1972).

Biostar Opeation & Training Manual. Great Lakes Orthodontics, Ltd. 199 Fire Tower Drive, Tonawanda, New York. 14150-5890, 20 pages total (1990).

(56) References Cited

OTHER PUBLICATIONS

Blu, et al., "Linear interpolation revitalized", IEEE Trans. Image Proc., 13(5):710-719 (May 2004.
Bourke, "Coordinate System Transformation," (Jun. 1996), p. 1, retrieved from the Internet Nov. 5, 2004, URL< http://astronomy.swin.edu.au/-pbourke/prolection/coords>.
Boyd et al., "Three Dimensional Diagnosis and Orthodontic Treatment of Complex Malocclusions With the Invisalipn Appliance," Semin. Orthod., 7(4):274-293 (Dec. 2001).
Brandestini et al., "Computer Machined Ceramic Inlays: In Vitro Marginal Adaptation," J. Dent. Res. Special Issue, Abstract 305, vol. 64, p. 208 (1985).
Brook et al., "An Image Analysis System for the Determination of Tooth Dimensions from Study Casts: Comparison with Manual Measurements of Mesio-distal Diameter," J. Dent. Res., 65(3):428-431 (Mar. 1986).
Burstone et al., Precision Adjustment of the Transpalatal Lingual Arch: Computer Arch Form IN Predetermination, Am, Journal of Orthodontics, vol. 79, No. 2 (Feb. 1981), pp. 115-133.
Burstone (interview), "Dr. Charles J. Burstone on The Uses of the Computer in Orthodontic Practice (Part 1)," J. Clin. Orthod., 13(7):442-453 (Jul. 1979).
Burstone (interview), "Dr. Charles J. Burstone on The Uses of the Computer in Orthodontic Practice (Part 2)," J. Clin. Orthod., 13(8):539-551 (Aug. 1979).
Cardinal Industrial Finishes, Powder Coatings information posted at< http://www.cardinalpaint.com> on Aug. 25, 2000, 2 pages.
Carnaghan, "An Alternative to Holograms for the Portrayal of Human Teeth," 4th Int'l. Conf. on Holographic Systems, Components and Applications, Sep. 15, 1993, pp. 228-231.
Chaconas et al., "The DigiGraph Work Station, Part 1, Basic Concepts," JCO, pp. 360-367 (Jun. 1990).
Chafetz et al., "Subsidence of the Femoral Prosthesis, A Stereophotogrammetric Evaluation," Clin. Orthop. Relat. Res., No. 201, pp. 60-67 (Dec. 1985).
Chiappone, (1980). Constructing the Gnathologic Setup and Positioner, J. Clin. Orthod, vol. 14, pp. 121-133.
Cottingham, (1969). Gnathologic Clear Plastic Positioner, Am. J. Orthod, vol. 55, pp. 23-31.
Crawford, "CAD/CAM in the Dental Office: Does It Work?", Canadian Dental Journal, vol. 57, No. 2, pp. 121-123 (Feb. 1991).
Crawford, "Computers in Dentistry: Part 1 CAD/CAM: The Computer Moves Chairside," Part 2 F. Duret—A Man with a Vision, "Part 3 The Computer Gives New Vision—Literally," Part 4 Bytes 'N Bites—The Computer Moves from the Front Desk to the Operatory, Canadian Dental Journal, vol. 54 (9), pp. 661-666 (1988).
Crooks, "CAD/CAM Comes to USC," Usc Dentistry, pp. 14-17 (Spring 1990).
Cureton, Correcting Malaligned Mandibular Incisors with Removable Retainers, J. Clin. Orthod, vol. 30, No. 7 (1996) pp. 390-395.
Curry et al., "Integrated Three-Dimensional Craniofacial Mapping at the Craniofacial Research Instrumentation Laboratory/University of the Pacific," Semin. Orthod., 7(4):258-265 (Dec. 2001).
Cutting et a/., "Three-Dimensional Computer-Assisted Design of Craniofacial Surgical Procedures: Optimization and Interaction with Cephalometric and CT-Based Models," Plast. 77(6):877-885 (Jun. 1986).
DCS Dental AG, "The CAD/CAM 'DCS Titan System' for Production of Crowns/Bridges," DSC Production AG, pp. 1-7 (Jan. 1992.
Definition for gingiva. Dictionary.com p. 1-3. Retrieved from the internet Nov. 5, 2004< http://reference.com/search/search?q=gingiva>.
Defranco et al., "Three-Dimensional Large Displacement Analysis of Orthodontic Appliances," J. Biomechanics, 9:793-801 (1976).
Dental Institute University of Zurich Switzerland, Program for International Symposium JD on Computer Restorations: State of the Art of the CEREC-Method, May 1991, 2 pages total.
Dentrac Corporation, Dentrac document, pp. 4-13 (1992).
DENT-X posted on Sep. 24, 1998 at< http://www.dent-x.com/DentSim.htm>, 6 pages.
Doyle, "Digital Dentistry," Computer Graphics World, pp. 50-52, 54 (Oct. 2000).
DuraClearTM product information, Allesee Orthodontic Appliances-Pro Lab, 1 page (1997).
Duret et al., "CAD/CAM Imaging in Dentistry," Curr. Opin. Dent., 1:150-154 (1991).
Duret et al., "CAD-CAM in Dentistry," J. Am. Dent. Assoc. 117:715-720 (Nov. 1988).
Duret, "The Dental CAD/CAM, General Description of the Project," Hennson International Product Brochure, 18 pages total, Jan. 1986.
Duret,"Vers Une Prosthese Informatisee," (English translation attached), Tonus, vol. 75, pp. 55-57 (Nov. 15, 1985).
Economides, "The Microcomputer in the Orthodontic Office," JCO, pp. 767-772 (Nov. 1979).
Elsasser, Some Observations on the History and Uses of the Kesling Positioner, Am. J. Orthod. (1950) 36:368-374.
English translation of Japanese Laid-Open Publication No. 63-11148 to inventor T. Ozukuri (Laid-Open on Jan. 18, 1998) pp. 1-7.
Felton et al., "A Computerized Analysis of the Shape and Stability of Mandibular Arch Form," Am. J. Orthod. Dentofacial Orthop., 92(6):478-483 (Dec. 1987).
Friede et al., "Accuracy of Cephalometric Prediction in Orthognathic Surgery," Abstract of Papers, J. Dent. Res., 70:754-760 (1987).
Futterling et a/., "Automated Finite Element Modeling of a Human Mandible with Dental Implants," JS WSCG '98—Conference Program, retrieved from the Internet:< http://wscg.zcu.cz/wscg98/papers98/Strasser 98.pdf>, 8 pages.
Gao et al., "3-D element Generation for Multi-Connected Complex Dental and Mandibular Structure," Proc. Intl Workshop on Medical Imaging and Augmented Reality, pp. 267-271 (Jun. 12, 2001).
GIM-ALLDENT Deutschland, "Das DUX System: Die Technik," 2 pages total (2002).
Gottleib et al., "JCO Interviews Dr. James A. McNamura, Jr., on the Frankel Appliance: Part 2: Clinical 1-1 Management," J. Clin. Orthod., 16(6):390-407 (Jun. 1982).
Grayson, "New Methods for Three Dimensional Analysis of Craniofacial Deformity, Symposium: JW Computerized Facial Imaging in Oral and Maxiiofacial Surgery," AAOMS, 3 pages total, (Sep. 13, 1990).
Guess et al., "Computer Treatment Estimates In Orthodontics and Orthognathic Surgery," JCO, pp. 262-28 (Apr. 1989).
Heaven et a/., "Computer-Based Image Analysis of Artificial Root Surface Caries," Abstracts of Papers, J. Dent. Res., 70:528 (Apr. 17-21, 1991).
Highbeam Research, "Simulating Stress Put on Jaw," Tooling & Production [online], Nov. 1996, n pp. 1-2, retrieved from the Internet on Nov. 5, 2004, URL http://static.highbeam.com/t/toolingampproduction/november011996/simulatingstressputonfa . . . >.
Hikage, "Integrated Orthodontic Management System for Virtual Three-Dimensional Computer Graphic Simulation and Optical Video Image Database for Diagnosis and Treatment Planning", Journal of Japan KA Orthodontic Society, Feb. 1987, English translation, pp. 1-38, Japanese version, 46(2), pp. 248-269 (60 pages total).
Hoffmann, et al., "Role of Cephalometry for Planning of Jaw Orthopedics and Jaw Surgery Procedures," (Article Summary in English, article in German), Informatbnen, pp. 375-396 (Mar. 1991).
Hojjatie et al., "Three-Dimensional Finite Element Analysis of Glass-Ceramic Dental Crowns," J. Biomech., 23(11):1157-1166 (1990).
Huckins, "CAD-CAM Generated Mandibular Model Prototype from MRI Data," AAOMS, p. 96 (1999).
Important Tip About Wearing the Red White & Blue Active Clear Retainer System, Allesee Orthodontic Appliances-Pro Lab, 1 page 1998).
JCO Interviews, Craig Andreiko , DDS, MS on the Elan and Orthos Systems, JCO, pp. 459-468 (Aug. 1994).
JCO Interviews, Dr. Homer W. Phillips on Computers in Orthodontic Practice, Part 2, JCO. 1997; 1983:819-831.

(56) References Cited

OTHER PUBLICATIONS

Jerrold, "The Problem, Electronic Data Transmission and the Law," AJO-DO, pp. 478-479 (Apr. 1988).
Jones et al., "An Assessment of the Fit of a Parabolic Curve to Pre- and Post-Treatment Dental Arches," Br. J. Orthod., 16:85-93 (1989).
JP Faber et al., "Computerized Interactive Orthodontic Treatment Planning," Am. J. Orthod., 73(1):36-46 (Jan. 1978).
Kamada et.al., Case Reports On Tooth Positioners Using LTV Vinyl Silicone Rubber, J. Nihon University School of Dentistry (1984) 26(1): 11-29.
Kamada et.al., Construction of Tooth Positioners with LTV Vinyl Silicone Rubber and Some Case KJ Reports, J. Nihon University School of Dentistry (1982) 24(1):1-27.
Kanazawa et al., "Three-Dimensional Measurements of the Occlusal Surfaces of Upper Molars in a Dutch Population," J. Dent Res., 63(11):1298-1301 (Nov. 1984).
Kesling, Coordinating the Predetermined Pattern and Tooth Positioner with Conventional Treatment, KN Am. J. Orthod. Oral Surg. (1946) 32:285-293.
Kesling et al., The Philosophy of the Tooth Positioning Appliance, American Journal of Orthodontics and Oral surgery. 1945; 31:297-304.
Kleeman et al., The Speed Positioner, J. Clin. Orthod. (1996) 30:673-680.
Kochanek, "Interpolating Splines with Local Tension, Continuity and Bias Control," Computer Graphics, ri 18(3):33-41 (Jul. 1984). KM Oral Surgery (1945) 31 :297-30.
Kunii et al., "Articulation Simulation for an Intelligent Dental Care System," Displays 15:181-188 (1994).
Kuroda et al., Three-Dimensional Dental Cast Analyzing System Using Laser Scanning, Am. J. Orthod. Dentofac. Orthop. (1996) 110:365-369.
Laurendeau, et al., "A Computer-Vision Technique for the Acquisition and Processing of 3-D Profiles of 7 KR Dental Imprints: An Application in Orthodontics," IEEE Transactions on Medical Imaging, 10(3):453-461 (Sep. 1991.
Leinfelder, et al., "A New Method for Generating Ceramic Restorations: a CAD-CAM System," J. Am. 1-1 Dent. Assoc., 118(6):703-707 (Jun. 1989).
Manetti, et al., "Computer-Aided Cefalometry and New Mechanics in Orthodontics," (Article Summary in English, article in German), Fortschr Kieferorthop. 44, 370-376 (Nr. 5), 1983.
Mccann, "Inside the ADA," J. Amer. Dent. Assoc., 118:286-294 (Mar. 1989).
Mcnamara et al., "Invisible Retainers," J. Cfin. Orthod., pp. 570-578 (Aug. 1985).
Mcnamara et al., Orthodontic and Orthopedic Treatment in the Mixed Dentition, Needham Press, pp. 347-353 (Jan. 1993).
Moermann et al., "Computer Machined Adhesive Porcelain Inlays: Margin Adaptation after Fatigue Stress," IADR Abstract 339, J. Dent. Res., 66(a):763 (1987).
Moles, "Correcting Mild Malalignments—As Easy As One, Two, Three," AOA/Pro Corner, vol. 11, No. 1, 2 pages (2002).
Mormann et al., "Marginale Adaptation von adhasuven Porzellaninlays in vitro," Separatdruck aus: Schweiz. Mschr. Zahnmed. 95: 1118-1129, 1985.
Nahoum, "The Vacuum Formed Dental Contour Appliance," N. Y. State Dent. J., 30(9):385-390 (Nov. 1964).
Nash, "CEREC CAD/CAM Inlays: Aesthetics and Durability in a Single Appointment," Dent. Today, 9(8):20, 22-23 (Oct. 1990).
Nishiyama et al., "A New Construction of Tooth Repositioner by LTV Vinyl Silicone Rubber," J. Nihon Univ. Sch. Dent., 19(2):93-102 (1977).
Paul et al., "Digital Documentation of Individual Human Jaw and Tooth Forms for Applications in Orthodontics, Oral Surgery and Forensic Medicine" Proc. of the 24th Annual Conf. of the IEEE Industrial Electronics Society (IECON '98), Sep. 4, 1998, pp. 2415-2418.
Pinkham, "Foolish Concept Propels Technology," Dentist, 3 pages total, Jan./Feb. 1989.
Pinkham, "Inventor's CAD/CAM May Transform Dentistry," Dentist, 3 pages total, Sep. 1990.
Ponitz, "Invisible Retainers," Am. J. Orthod., 59(3):266-272 (Mar. 1971).
Procera Research Projects, "Procera Research Projects 1993—Abstract Collection," pp. 3-7; 28 (1993).
Proffit et al., Contemporary Orthodontics, (Second Ed.), Chapter 15, Mosby Inc., pp. 470-533 (Oct. 1993.
Raintree Essix & ARS Materials, Inc., Raintree Essix, Technical Magazine Table of contents and Essix Appliances, < http://www.essix.com/magazine/defaulthtml> Aug. 13, 1997.
Redmond et al., "Clinical Implications of Digital Orthodontics," Am. J. Orthod. Dentofacial Orthop., 117(2):240-242 (2000).
Rekow, "A Review of the Developments in Dental CAD/CAM Systems," (contains references to Japanese efforts and content of the papers of particular interest to the clinician are indicated with a one line summary of their content in the bibliography), Curr. Opin. Dent., 2:25-33 (Jun. 1992).
Rekow, "CAD/CAM in Dentistry: A Historical Perspective and View of the Future," J. Can. Dent. Assoc., 58(4):283, 287-288 (Apr. 1992).
Rekow, "Computer-Aided Design and Manufacturing in Dentistry: A Review of the State of the Art," J. Prosthet. Dent., 58(4):512-516 (Oct. 1987).
Rekow, "Dental CAD-CAM Systems: What is the State of the Art?", J. Amer. Dent. Assoc., 122:43-48 1991.
Rekow et al., "CAD/CAM for Dental Restorations—Some of the Curious Challenges," IEEE Trans. Biomed. Eng., 38(4):314-318 (Apr. 1991).
Rekow et al., "Comparison of Three Data Acquisition Techniques for 3-D Tooth Surface Mapping," Annual International Conference of the IEEE Engineering in Medicine and Biology Society, 13(1):344-345 1991.
Rekow, "Feasibility of an Automated System for Production of Dental Restorations, Ph.D. Thesis," Univ. of Minnesota, 244 pages total, Nov. 1988.
Richmond et al., "The Development of a 3D Cast Analysis System," Br. J. Orthod., 13(1):53-54 (Jan. 1986).
Richmond et al., "The Development of the PAR Index (Peer Assessment Rating): Reliability and Validity," Eur. J. Orthod., 14:125-139 (1992).
Richmond, "Recording The Dental Cast In Three Dimensions," Am. J. Orthod. Dentofacial Orthop., 92(3):199-206 (Sep. 1987).
Rudge, "Dental Arch Analysis: Arch Form, A Review of the Literature," Eur. J. Orthod., 3(4):279-284 1981.
Sakuda et al., "Integrated Information-Processing System In Clinical Orthodontics: An Approach with Use of a Computer Network System," Am. J. Orthod. Dentofacial Orthop., 101(3): 210-220 (Mar. 1992).
Schellhas et al., "Three-Dimensional Computed Tomography in Maxillofacial Surgical Planning," Arch. Otolamp!. Head Neck Sur9., 114:438-442 (Apr. 1988).
Schroeder et al., Eds. The Visual Toolkit, Prentice Hall PTR, New Jersey (1998) Chapters 6, 8 & 9, (pp. 153-210,309-354, and 355-428, respectively.
Shilliday, (1971). Minimizing finishing problems with the mini-positioner, Am. J. Orthod. 59:596-599.
Siemens, "CEREC—Computer-Reconstruction," High Tech in der Zahnmedizin, 14 pages total (2004).
Sinclair, "The Readers' Corner," J. Clin. Orthod., 26(6):369-372 (Jun. 1992).
Sirona Dental Systems GmbH, CEREC 3D, Manuel utilisateur, Version 2.0X (in French), 2003,114 pages total.
Stoll et al., "Computer-aided Technologies in Dentistry," (article summary in English, article in German), Dtsch Zahna'rztl Z 45, pp. 314-322 (1990).
Sturman, "Interactive Keyframe Animation of 3-D Articulated Models," Proceedings Graphics Interface '84, May-Jun. 1984, pp. 35-40.
The Choice Is Clear: Red, White & Blue . . . The Simple, Affordable, No-Braces Treatment, Allesee HI Orthodontic Appliances-Pro Lab product information for doctors. http://ormco.com/aoa/appliancesservices/RWB/doctorhtml>, 5 pages (May 19, 2003).

(56) References Cited

OTHER PUBLICATIONS

The Choice is Clear: Red, White & Blue . . . The Simple, Affordable, No-Braces Treatment, Allesee HJ Orthodontic Appliances-Pro Lab product information for patients,< http://ormco.com/aoa/appliancesservices/RWB/patients.html>, 2 pages (May 19, 2003).
The Choice Is Clear: Red, White & Blue . . . The Simple, Affordable, No-Braces Treatment, Allesee Orthodontic Appliances-Pro Lab product information, 6 pages (2003).
The Red, White & Blue Way to Improve Your Smile! Allesee Orthodontic Appliances-Pro Lab product information for patients, 2 pages 1992.
Truax L., "Truax Clasp-Less(TM) Appliance System," Funct. Orthod., 9(5):22-4, 26-8 (Sep.-Oct. 1992).
Tru-Tain Orthodontic & Dental Supplies, Product Brochure, Rochester, Minnesota 55902, 16 pages total (1996).
U.S. Department of Commerce, National Technical Information Service, "Automated Crown Replication Using Solid Photography SM," Solid Photography Inc., Melville NY, Oct. 1977, 20 pages total.
U.S. Department of Commerce, National Technical Information Service, "Holodontography: An Introduction to Dental Laser Holography," School of Aerospace Medicine Brooks AFB Tex, Mar. 1973, 37 pages total.
U.S. Appl. No. 60/050,342, filed Jun. 20, 1997, 41 pages total.
Van Der Linden, "A New Method to Determine Tooth Positions and Dental Arch Dimensions," J. Dent. Res., 51(4):1104 (Jul.-Aug. 1972).
Van Der Linden et al., "Three-Dimensional Analysis of Dental Casts by Means of the Optocom," J. Dent. Res., p. 1100 (Jul.-Aug. 1972).
Van Der Zel, "Ceramic-Fused-to-Metal Restorations with a New CAD/CAM System," Quintessence Int., 24(11):769-778 (1993.
Varady et al., "Reverse Engineering Of Geometric Models—An Introduction," Computer-Aided Design, 29(4):255-268, 1997.
Verstreken et al., "An Image-Guided Planning System for Endosseous Oral Implants," IEEE Trans. Med. Imaging, 17(5):842-852 (Oct. 1998).
Warunek et al., Physical and Mechanical Properties of Elastomers in Orthodonic Positioners, Am J. Orthod. Dentofac. Orthop, vol. 95, No. 5, (May 1989) pp. 399-400.
Warunek et.al., Clinical Use of Silicone Elastomer Applicances, JCO (1989) XXIII(10):694-700.
Wells, Application of the Positioner Appliance in Orthodontic Treatment, Am. J. Orthodont. (1970) 58:351-366.
Williams, "Dentistry and CAD/CAM: Another French Revolution," J. Dent. Practice Admin., pp. 2-5 (Jan./Mar. 1987).
Williams, "The Switzerland and Minnesota Developments in CAD/CAM," J. Dent. Practice Admin., pp. 50-55 (Apr./Jun. 1987.
Wishan, "New Advances in Personal Computer Applications for Cephalometric Analysis, Growth Prediction, Surgical Treatment Planning and Imaging Processing," Symposium: Computerized Facial Imaging in Oral and Maxilofacial Surgery Presented on Sep. 13, 1990.
WSCG'98—Conference Program, "The Sixth International Conference in Central Europe on Computer Graphics and Visualization '98," Feb. 9-13, 1998, pp. 1-7, retrieved from the Internet on Nov. 5, 2004, URL<http://wscg.zcu.cz/wscg98/wscg98.h>.
Xia et al., "Three-Dimensional Virtual-Reality Surgical Planning and Soft-Tissue Prediction for Orthognathic Surgery," IEEE Trans. Inf. Technol. Biomed., 5(2):97-107 (Jun. 2001).
Yamamoto et al., "Optical Measurement of Dental Cast Profile and Application to Analysis of Three-Dimensional Tooth Movement in Orthodontics," Front. Med. Biol. Eng., 1(2):119-130 (1988).
Yamamoto et al., "Three-Dimensional Measurement of Dental Cast Profiles and Its Applications to Orthodontics," Conf. Proc. IEEE Eng. Med. Biol. Soc., 12(5):2051-2053 (1990).
Yamany et al., "A System for Human Jaw Modeling Using Intra-Oral Images," Proc. of the 20th Annual Conf. of the IEEE Engineering in Medicine and Biology Society, Nov. 1, 1998, vol. 2, pp. 563-566.
Yoshii, "Research on a New Orthodontic Appliance: The Dynamic Positioner (D.P.); I. The D.P. Concept and Implementation of Transparent Silicone Resin (Orthocon)," Nippon Dental Review, 452:61-74 (Jun. 1980).
Yoshii, "Research on a New Orthodontic Appliance: The Dynamic Positioner (D.P.); II. The D.P. Manufacturing Procedure and Clinical Applications," Nippon Dental Review, 454:107-130 (Aug. 1980).
Yoshii, "Research on a New Orthodontic Appliance: The Dynamic Positioner (D.P.); III. The General Concept of the D.P. Method and Its Therapeutic Effect, Part 1, Dental and Functional Reversed Occlusion Case Reports," Nippon Dental Review, 457:146-164 (Nov. 1980).
Yoshii, "Research on a New Orthodontic Appliance: The Dynamic Positioner (D.P.); III.—The General Concept of the D.P. Method and Its Therapeutic Effect, Part 2. Skeletal Reversed Occlusion Case Reports," Nippon Dental Review, 458:112-129 (Dec. 1980).
You May Be A Candidate For This Invisible No-Braces Treatment, Allesee Orthodontic Appliances-Pro Lab product information for patients, 2 pages (2002).
Baccetti, et al. An improved version of the cervical vertebral maturation (CVM) method for the assessment of mandibular growth. Angle Orthod. Aug. 2002;72(4):316-23.
Franchi, et al. Mandibular growth as related to cervical vertebral maturation and body height. Am J Orthod Dentofacial Orthop. Sep. 2000;118(3):335-40.
International search report with written opinion dated Jul. 4, 2017 for PCT/US2017/024141.
Kapoor, et al. Effect of orthodontic forces on cytokine and receptor levels in gingival crevicular fluid: a systematic review. Prog Orthod. Dec. 9, 2014;15:65. doi: 10.1186/s40510-014-0065-6.
Kumar, et al. Biomarkers in orthodontic tooth movement. J Pharm Bioallied Sci. Aug. 2015; 7(Suppl 2): S325-S330.
Smith, et al. Mechanics of tooth movement. Am. J. Orthod. 1984; 85:294-307.
Viecilli, et al. Axes of resistance for tooth movement: does the center of resistance exist in 3-dimensional space? Am J Orthod Dentofacial Orthop. Feb. 2013;143(2):163-72. doi: 10.1016/j.ajodo.2012.09.010.

* cited by examiner

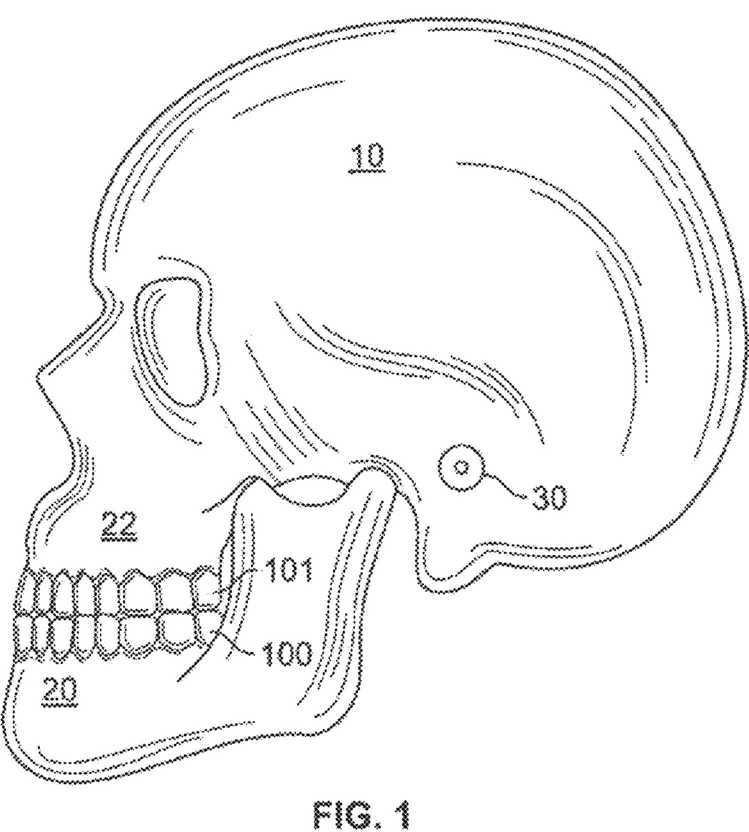
FIG. 1
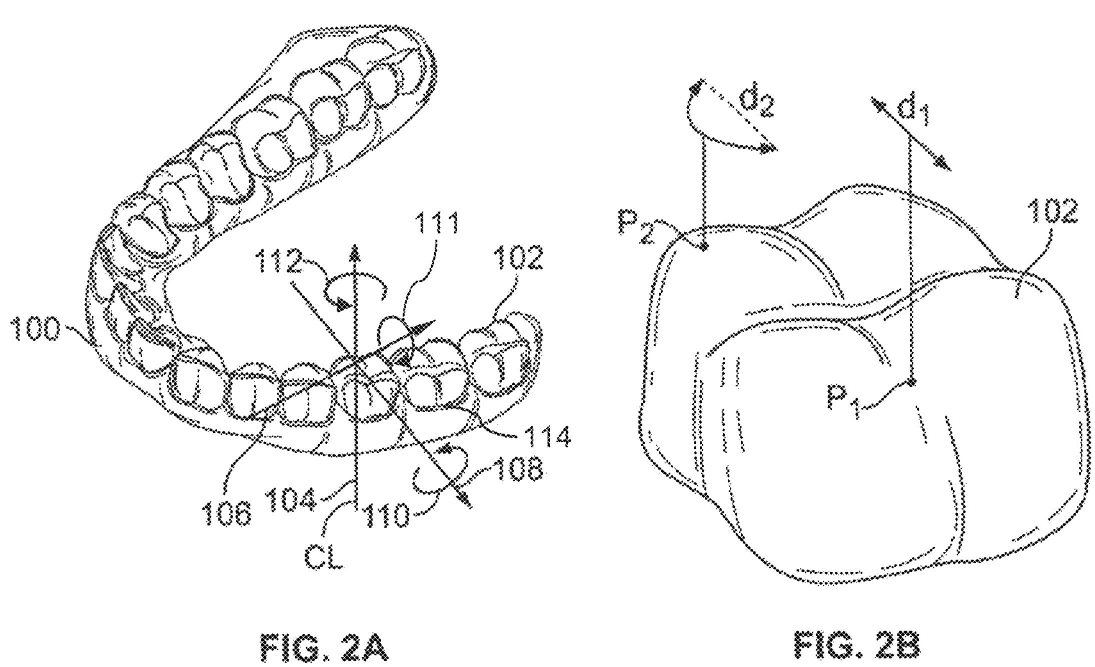
FIG. 2A
FIG. 2B

Figure 3C:
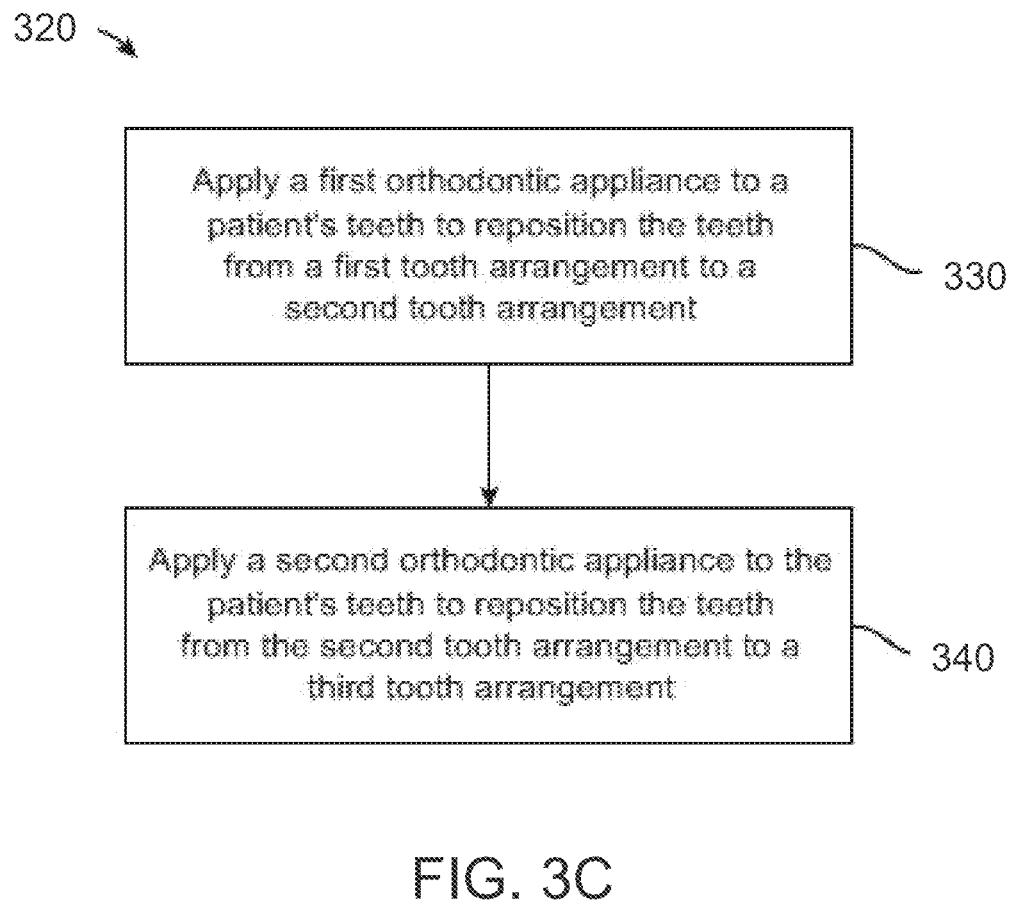

320

Apply a first orthodontic appliance to a patient's teeth to reposition the teeth from a first tooth arrangement to a second tooth arrangement

330

Apply a second orthodontic appliance to the patient's teeth to reposition the teeth from the second tooth arrangement to a third tooth arrangement

| STAGE | 7(2) | 6(3) | 4(5) | 3(6) | 2(7) | 1(8) | 1(9) | 2(10) | 3(11) | 4(12) | 6(14) | 7(15) |
|---|---|---|---|---|---|---|---|---|---|---|---|---|
| 0 | | | | | | | | | | | | |
| 1 | | | | | | | | | | | | |
| 2 | | | | | | | | | | | | |
| 3 | | | | | | | | | | | | |
| 4 | | | | | | | | | | | | |
| 5 | | | | | | | | | | | | |
| 6 | | | | | | | | | | | | |
| 7 | | | | | | | | | | | | |
| 8 | | | | | | | | | | | | |
| 9 | | | | | | | | | | | | |

FIG. 18

SYSTEMS, METHODS, AND DEVICES FOR PREDICTABLE ORTHODONTIC TREATMENT

CROSS-REFERENCE

This application is a continuation application of International Application No. PCT/US2017/024141, filed Mar. 24, 2017, published as WO/2017/172537 on Oct. 5, 2017, which claims the benefit of U.S. Provisional Application No. 62/314,317, filed on Mar. 28, 2016, the entire disclosure of which is incorporated herein by reference.

BACKGROUND

Prior orthodontic procedures typically involve repositioning a patient's teeth to a desired arrangement in order to correct malocclusions and/or improve aesthetics. To achieve these objectives, orthodontic appliances such as braces, shell aligners, and the like can be applied to the patient's teeth by an orthodontic practitioner. The appliance can be configured to exert force on one or more teeth in order to effect desired tooth movements according to a treatment plan.

In some instances, prior approaches may not account for patient-specific, tooth-specific, and movement-specific physiological factors when determining a treatment plan for repositioning teeth, which may be detrimental to the efficacy, safety, and predictability of treatment. Work in relation to the present disclosure suggests that moving teeth with too little movement between each stage of treatment can result in tooth movement that is somewhat irregular and less than ideally predictable. For example, it may take several appliances before a tooth will receive sufficient force to start moving. Further, moving a tooth too quickly can result in cell necrosis. Also, prior systems which program one rate or velocity for every tooth in every direction can be flawed, because such systems do not address the fact that the rate of tooth movement is dependent on physiological factors, such as the type of tooth and type of movement. Some prior approaches have used the tooth with the largest movement to determine the length of treatment and the number of treatment stages, and slowed the movements of other teeth to match this number of stages. This approach can be flawed and result in a less than ideal treatment plan because the small amount of movement between stages can result in irregular and less predictable tooth movement for at least some of the teeth. Further, a logical extension of this concept suggests that large movements take place quickly and small movements take place slowly. This conclusion, however, is not correct in orthodontics, and treatments based on this paradigm can result in less than ideal treatments in at least some instances.

Thus, there is a need for improved orthodontic treatment planning and appliances.

SUMMARY

The present disclosure provides improved systems, methods, appliances and devices for planning and effecting orthodontic treatment of a patient's teeth. In some embodiments, movement velocities, such as directional target velocities, can be used to plan the movement velocity of each tooth independently of other teeth, which produces a treatment plan with more predictable orthodontic movement and treatment. The treatment plan can be configured in accordance with the rates at which different types of teeth move readily, the appropriate physiological rate of movement in the direction of movement for a type of tooth and the type of tooth movement, so as to provide a treatment plan with a high probability of being achieved. The treatment plan may comprise a plurality of movement stages. The treatment plan and corresponding movement stages can be configured for each tooth to move with a corresponding velocity and trajectory related to a maximum velocity that the tooth is capable of moving along the trajectory, such as a velocity within about 25% of the maximum velocity. For each of the teeth, a number of movement stages can be determined in response to the movement trajectory and velocity along the trajectory for the tooth. The total number of movement stages for treatment can be determined in response to the tooth having the greatest determined number of stages. As some of the teeth will have a number of movement stages less than the total number of treatment stages, some of movement stages may comprise no substantial movement velocity for those teeth. This approach can provide staging and appliances that improve the reliability of teeth movement by moving teeth at rates and trajectories for which movement is more predictable, and by decreasing the use of velocities and trajectories that can result in irregular tooth movement.

In some embodiments, an orthodontic treatment plan involves moving one or more teeth from an initial tooth arrangement towards a target tooth arrangement. The appropriate movement velocity for each tooth may vary, for example, according to patient-specific factors, tooth type, the type of tooth movement, the direction of tooth movement, and/or additional treatment considerations. The embodiments herein permit determining a target movement velocity for each tooth independently, such that the rate and/or timing of repositioning can be customized for each particular tooth, without necessarily being tied to the rate and/or timing of repositioning of any other tooth. Moreover, in some embodiments, movement velocities can be independently determined and applied for different directions of tooth movement, such that directional components of the planned movement can be decoupled and may occur and conclude at different times during treatment. Advantageously, this approach can be used to provide patient-specific orthodontic treatment planning with improved control over tooth movements, efficacy, and predictability.

In one aspect, a system for generating a treatment plan for repositioning a plurality of teeth is provided. The system can comprise one or more processors and memory. The memory can comprise instructions that, when executed by the one or more processors, cause the one or more processors to receive a digital data set representing the plurality of teeth. The one or more processors can determine a movement trajectory for repositioning each tooth of the plurality of teeth from an initial position and orientation towards a target position and orientation. The movement trajectory of at least one tooth of the plurality of teeth can comprise movement along a plurality of different directions. The one or more processors can determine a movement velocity for repositioning each tooth along the corresponding movement trajectory. The movement velocity can be determined independently for each tooth of the plurality of teeth and for each direction of the plurality of different directions.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1 is an elevational diagram showing the anatomical relationship of the jaws of a patient, in accordance with embodiments;

FIG. 2A shows in more detail the patient's lower jaw and provides a general indication of how teeth may move, in accordance with embodiments:

FIG. 2B shows a single tooth from FIG. 2A and defines how tooth movement distances can be determined, in accordance with embodiments:

FIG. 3C illustrates a method of orthodontic treatment using a plurality of appliances, in accordance with embodiments;

FIG. 18 illustrates the movement stages for treating teeth with a plurality of appliances, in accordance with embodiments.

DETAILED DESCRIPTION

Figure 3A:
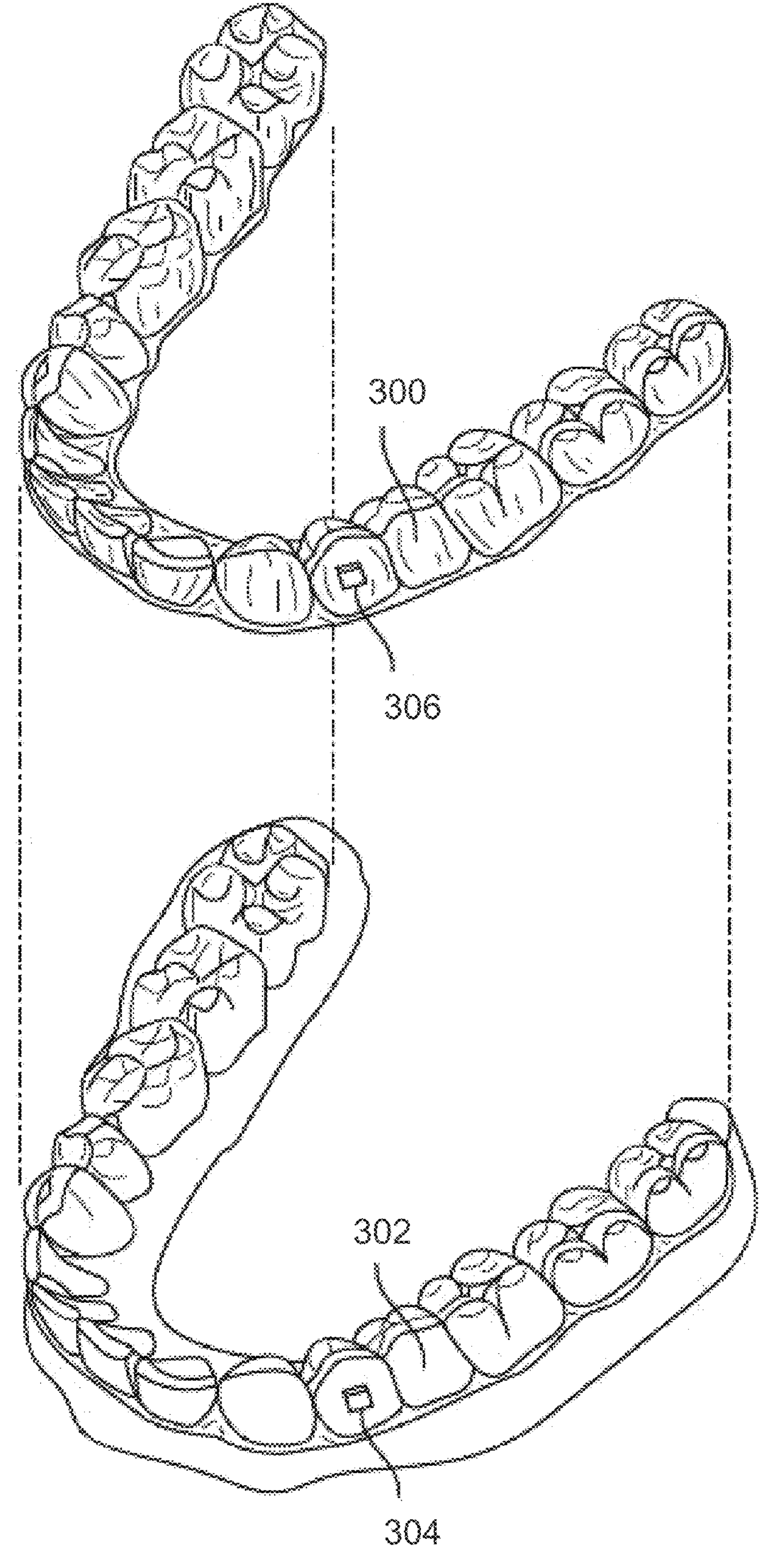
FIG. 3A illustrates a tooth repositioning appliance, in accordance with embodiments.

Improved systems, methods, and devices for orthodontic treatment planning are provided. In some embodiments, efficacy of tooth movements may be compromised if tooth movement is planned without consideration of physiological factors that may influence the rate of orthodontic tooth movement, such as tooth type, movement type, movement direction, and patient-specific characteristics (e.g., rate of metabolism, bone density, etc.). The treatment planning approaches described herein recognize and account for such physiological factors, thus providing more physiologically accurate and patient-specific treatment planning. Additionally, in some embodiments, treatment plans that do not permit asynchronous tooth movement (e.g., treatment plans in which all teeth are moved simultaneously throughout the duration of treatment regardless of the amount of planned movement) may result in relatively low forces applied to teeth, which may also compromise movement efficacy. The various embodiments of the present disclosure allow for movements of different teeth and/or movements along different directions to be decoupled from each other and performed asynchronously, thus improving the flexibility, predictability, and efficacy of orthodontic treatment.

In one aspect, a system for generating a treatment plan for repositioning a plurality of teeth is provided. The system can comprise one or more processors and memory. The memory can comprise instructions that, when executed by the one or more processors, cause the one or more processors to receive a digital data set representing the plurality of teeth; determine a movement trajectory for repositioning each tooth of the plurality of teeth from an initial position and orientation towards a target position and orientation; and determine a movement velocity for repositioning each tooth along the corresponding movement trajectory. The movement velocity can be determined independently for said each tooth of the plurality of teeth. Alternatively or in combination, the plurality of teeth can be categorized into a plurality of different subgroups (e.g., based on tooth type, tooth characteristics, location in the arch, etc.), and the movement velocity can be determined independently for each subgroup of the plurality of different subgroups.

The movement velocity for each tooth can be determined in one or more of a variety of ways. In some embodiments, the movement velocity is determined based on one or more patient-specific characteristics. The one or more patient-specific characteristics can comprise one or more of: age, metabolic rate, bone density, skeletal maturity, periodontal condition, intraoral organism population, saliva composition, saliva characteristics, biomarker concentrations, pregnancy status, obesity status, body mass index (BMI), or drug use status.

In some embodiments, the movement velocity for each tooth is determined based on a tooth type of the tooth. The tooth type can comprise one or more of an incisor, a canine, a premolar, a molar, an anterior tooth, a posterior tooth, a central tooth, a lateral tooth, a single-rooted tooth, a multi-rooted tooth, a primary tooth, a permanent tooth, a partially erupted tooth, a fully erupted tooth, an ectopic tooth, a small-sized tooth, an average-sized tooth, a large-sized tooth, a maxillary tooth, or a mandibular tooth.

In some embodiments, the movement velocity for each tooth is determined based on a movement type of the corresponding movement trajectory. The movement type can comprise one or more of a rotational movement, a translational movement, a crown-based movement, a root-based movement, a bodily movement, an uncontrolled tipping movement, a controlled tipping movement, an uprighting movement, a torque movement, an inclination change movement, a first order movement, a second order movement, or a third order movement.

In some embodiments, the movement velocity for each tooth is determined based on a direction of movement of the tooth in the corresponding movement trajectory. The direction can comprise one or more of a mesial direction, a distal direction, a buccal direction, a lingual direction, an intrusion direction, an extrusion direction, a rotational direction, a retraction direction, a lateral direction, a transverse direction, a vertical direction, a facial direction, a sagittal direction, an apical direction, or a coronal direction. The direction can comprise one or more of: a crown mesial direction, a crown distal direction, a crown buccal direction, a crown lingual direction, a root mesial direction, a root distal direction, a root buccal direction, a root lingual direction, an intrusion direction, an extrusion direction, a positive rotation direction, or a negative rotation direction.

In some embodiments, the movement velocity is selected from a set of movement velocity values generated based on one or more of expert opinion or clinical data.

In some embodiments, the instructions further cause the one or more processors to use the movement velocity to determine a number of movement stages for repositioning each tooth along the corresponding movement trajectory. The number of movement stages can differ for at least some of the plurality of teeth.

In some embodiments, the instructions further cause the one or more processors to determine a distance between an axis of rotation and an axis of resistance of at least one tooth of the plurality of teeth. For example, the movement velocity of the at least one tooth can be determined based on the distance between the axis of rotation and the axis of resistance.

In some embodiments, the instructions further cause the one or more processors to modify one or more of the movement velocity or the movement trajectory of at least one tooth of the plurality of teeth. The modification can be based on one or more additional treatment considerations, such as one or more of, improved aesthetics, clinical outcomes, collision avoidance, a biological response to treatment, or feedback data from treatment.

In some embodiments, the instructions further cause the one or more processors to determine a plurality of movement stages for repositioning each tooth, based on the corresponding movement trajectory and the corresponding movement velocity. The one or more processors can generate data for fabricating a plurality of orthodontic appliances based on the plurality of movement stages.

In some embodiments, the number of movement stages differs among the plurality of teeth, said each of the plurality of teeth comprising a determined number of movement stages.

In some embodiments, a total number of treatment stages is greater than the plurality of movement stages for a portion of the plurality of teeth and wherein a difference between the plurality of movement stages for each tooth of the portion and the total number of treatment stages defines a number of stages with no substantial movement for said each tooth of the portion.

In some embodiments, a number of movement stages for which said each tooth moves along the movement trajectory is determined in response to said velocity and a distance along said trajectory for said each tooth.

In some embodiments, a portion of the plurality of teeth is not moved substantially for a part of the plurality of movement stages and is moved substantially for another part of the plurality of movement stages.

In some embodiments, each of the plurality of teeth is capable of a maximum movement velocity, the movement velocity comprising a substantial movement velocity corresponding to at least about 30% of the maximum movement velocity, and wherein the plurality of movement stages is arranged to selectively provide the substantial movement velocity or no substantial movement velocity, wherein said no substantial movement velocity comprises no more than about 0.1% of the maximum movement velocity.

In some embodiments, the plurality of movement stages is arranged so as not to define a movement velocity within a range from about 0.1% of the maximum movement velocity to about 25% of the maximum movement velocity for said each of the plurality of teeth.

In some embodiments, no tooth of the plurality of teeth comprises a velocity within a range from about 0.04% of the maximum velocity to about 40% of the maximum velocity for said each of the plurality of teeth.

In some embodiments, a first tooth of the plurality of teeth comprises a substantial velocity from a first movement stage to a last movement stage of the plurality of treatment stages and a second tooth of the plurality of teeth comprises a substantial velocity for a portion of the plurality of movement stages and an insubstantial velocity for another portion of the plurality of movement stages.

In some embodiments, a portion of the plurality of teeth is selected from the group consisting of an upper incisor, a lower incisor, a canine, an upper anterior tooth, and a lower anterior the maximum velocity of the portion of plurality of teeth is within a range from about 0.5 mm per week to about 0.15 mm per week.

In some embodiments, a portion of the plurality of teeth is selected from the group consisting of a molar and a premolar and the maximum velocity of each of the portion of plurality of teeth is within a range from about 0.03 mm per week to about 0.3 mm per week.

In some embodiments, a portion of the plurality of teeth is selected from the group consisting of an upper incisor, a lower incisor, a canine, an upper anterior tooth and a lower anterior the substantial velocity of the portion of the plurality of teeth is within a range from about 0.1 mm per week to about 0.4 mm per week.

In some embodiments, a portion of the plurality of teeth is selected from the group consisting of molars and premolars and the substantial velocity of the portion of the plurality of teeth is within a range from about 0.02 mm per week to about 0.25 mm per week.

In another aspect, a method for generating a treatment plan for repositioning a plurality of teeth is provided. The method can comprise: receiving, using one or more processors, a digital data set representing the plurality of teeth; determining, using the one or more processors, a movement trajectory for repositioning each tooth of the plurality of teeth from an initial position and orientation towards a target position and orientation; and determining, using the one or more processors, a movement velocity for repositioning each tooth along the corresponding movement trajectory. The movement velocity can be determined independently for each tooth of the plurality of teeth. Alternatively or in combination, the plurality of teeth can be categorized into a plurality of different subgroups (e.g., based on tooth type, tooth characteristics, location in the arch, etc.), and the movement velocity can be determined independently for each subgroup of the plurality of different subgroups.

The movement velocity for each tooth can be determined in one or more of a variety of ways. In some embodiments, the movement velocity is determined based on one or more patient-specific characteristics. The one or more patient-specific characteristics can comprise one or more of, age, metabolic rate, bone density, skeletal maturity, periodontal condition, intraoral organism population, saliva composition, saliva characteristics, biomarker concentrations, pregnancy status, obesity status, body mass index (BMI), or drug use status.

In some embodiments, the movement velocity for each tooth is determined based on a tooth type of the tooth. The tooth type can comprise one or more of: an incisor, a canine, a premolar, a molar, an anterior tooth, a posterior tooth, a central tooth, a lateral tooth, a single-rooted tooth, a multi-rooted tooth, a primary tooth, a permanent tooth, a partially erupted tooth, a fully erupted tooth, an ectopic tooth, a small-sized tooth, an average-sized tooth, a large-sized tooth, a maxillary tooth, or a mandibular tooth.

In some embodiments, the movement velocity for each tooth is determined based on a movement type of the corresponding movement trajectory. The movement type can comprise one or more of: a rotational movement, a translational movement, a crown-based movement, a root-based movement, a bodily movement, an uncontrolled tipping movement, a controlled tipping movement, an uprighting movement, a torque movement, an inclination change movement, a first order movement, a second order movement, or a third order movement.

In some embodiments, the movement velocity for each tooth is determined based on a direction of movement of the tooth in the corresponding movement trajectory. The direction can comprise one or more of a mesial direction, a distal direction, a buccal direction, a lingual direction, an intrusion direction, an extrusion direction, a rotational direction, a retraction direction, a lateral direction, a transverse direction, a vertical direction, a facial direction, a sagittal direction, an apical direction, or a coronal direction. The direction can comprise one or more of: a crown mesial direction, a crown distal direction, a crown buccal direction, a crown lingual direction, a root mesial direction, a root distal direction, a root buccal direction, a root lingual direction, an intrusion direction, an extrusion direction, a positive rotation direction, or a negative rotation direction.

In some embodiments, the movement velocity is selected from a set of movement velocity values generated based on one or more of expert opinion or clinical data.

In some embodiments, the method further comprises using the movement velocity to determine a number of movement stages for repositioning each tooth along the corresponding movement trajectory. The number of movement stages can differ for at least some of the plurality of teeth.

In some embodiments, the method further comprises determining a distance between an axis of rotation and an axis of resistance of at least one tooth of the plurality of teeth. The movement velocity of the at least one tooth can be determined based on the distance between the axis of rotation and the axis of resistance.

In some embodiments, the method further comprises modifying one or more of the movement velocity or the movement trajectory of at least one tooth of the plurality of teeth. The modification can be based on one or more additional treatment considerations. The one or more additional treatment considerations can comprise one or more of improved aesthetics, clinical outcomes, collision avoidance, a biological response to treatment, or feedback data from treatment.

In some embodiments, the method further comprises determining a plurality of movement stages for repositioning each tooth, based on the corresponding movement trajectory and the corresponding movement velocity; and fabricating a plurality of orthodontic appliances based on the plurality of movement stages.

In another aspect, one or more non-transitory computer-readable media are provided. The one or more non-transitory computer readable media can comprise instructions that, when executed by one or more processors, cause the one or more processors to: receive a digital data set representing the plurality of teeth; determine a movement trajectory for repositioning each tooth of the plurality of teeth from an initial position and orientation towards a target position and orientation; and determine a movement velocity for repositioning each tooth along the corresponding movement trajectory. The movement velocity can be determined independently for each tooth of the plurality of teeth. Alternatively or in combination, the plurality of teeth can be categorized into a plurality of different subgroups (e.g., based on tooth type, tooth characteristics, location in the arch, etc.), and the movement velocity can be determined independently for each subgroup of the plurality of different subgroups.

In another aspect, a system for generating a treatment plan for repositioning a tooth is provided. The system can comprise one or more processors and memory. The memory can comprise instructions that, when executed by the one or more processors, cause the one or more processors to: (a) receive a digital data set representing an initial position and orientation of the tooth; (b) determine a movement trajectory for repositioning the tooth from the initial position and orientation towards a target position and orientation, wherein the movement trajectory comprises movement along a plurality of different directions; and (c) determine a movement velocity for repositioning the tooth along each direction of the plurality of different directions, wherein the movement velocity is determined independently for each direction.

In some embodiments, the plurality of different directions comprises two or more of: a mesial direction, a distal direction, a buccal direction, a lingual direction, an intrusion direction, an extrusion direction, a rotational direction, a retraction direction, a lateral direction, a transverse direction, a vertical direction, a facial direction, a sagittal direction, an apical direction, or a coronal direction. The plurality of different directions can comprise two or more of: a crown mesial direction, a crown distal direction, a crown buccal direction, a crown lingual direction, a root mesial direction, a root distal direction, a root buccal direction, a root lingual direction, an intrusion direction, an extrusion direction, a positive rotation direction, or a negative rotation direction.

In some embodiments, the movement velocities for at least some of the plurality of different directions differ from each other.

In some embodiments, the movement velocity is further determined based on one or more of: patient-specific characteristics, a tooth type of the tooth, or a movement type of the movement trajectory.

In some embodiments, the movement velocity is selected from a set of movement velocity values generated based on one or more of expert opinion or clinical data.

In some embodiments, the instructions further cause the one or more processors to use the movement velocity to determine a number of movement stages for repositioning the tooth along each direction. The number of movement stages can differ for at least some of the plurality of different directions.

In some embodiments, the instructions further cause the one or more processors to repeat steps (a) through (c) for each tooth of a plurality of teeth.

In some embodiments, the instructions further cause the one or more processors to: (d) determine a movement schedule for repositioning the tooth along each direction of the plurality of different directions. The movement schedule can comprise repositioning the tooth along at least some of the plurality of different directions at different times.

In some embodiments, the instructions further cause the one or more processors to modify one or more of the movement velocity or the movement trajectory of the tooth. The modification can be based on one or more additional treatment considerations, such as one or more of: improved aesthetics, clinical outcomes, collision avoidance, a biological response to treatment, or feedback data from treatment.

In some embodiments, the instructions further cause the one or more processors to: determine a plurality of movement stages for repositioning the tooth, based on the movement trajectory and the movement velocity; and generate data for fabricating a plurality of orthodontic appliances based on the plurality of movement stages.

In another aspect, a method for generating a treatment plan for repositioning a tooth is provided. The method can comprise: (a) receiving, using one or more processors, a digital data set representing an initial position and orientation of the tooth; (b) determining, using the one or more processors, a movement trajectory for repositioning the tooth from the initial position and orientation towards a target position and orientation, wherein the movement trajectory comprises movement along a plurality of different directions; and (c) determining, using the one or more processors, a movement velocity for repositioning the tooth along each direction of the plurality of different directions, wherein the movement velocity is determined independently for each direction.

In some embodiments, the plurality of different directions comprises two or more of: a mesial direction, a distal direction, a buccal direction, a lingual direction, an intrusion direction, an extrusion direction, a rotational direction, a retraction direction, a lateral direction, a transverse direction, a vertical direction, a facial direction, a sagittal direction, an apical direction, or a coronal direction. The plurality of different directions can comprise two or more of: a crown mesial direction, a crown distal direction, a crown buccal direction, a crown lingual direction, a root mesial direction, a root distal direction, a root buccal direction, a root lingual direction, an intrusion direction, an extrusion direction, a positive rotation direction, or a negative rotation direction.

In some embodiments, the movement velocities for at least some of the plurality of different directions differ from each other.

In some embodiments, the movement velocity is further determined based on one or more of: patient-specific characteristics, a tooth type of the tooth, or a movement type of the movement trajectory.

In some embodiments, the movement velocity is selected from a set of movement velocity values generated based on one or more of expert opinion or clinical data.

In some embodiments, the method further comprises using the movement velocity to determine a number of movement stages for repositioning the tooth along each direction. The number of movement stages can differ for at least some of the plurality of different directions.

In some embodiments, the method further comprises repeating steps (a) through (c) for each tooth of a plurality of teeth.

In some embodiments, the method further comprises: (d) determining a movement schedule for repositioning the tooth along each direction of the plurality of different directions. The movement schedule can comprise repositioning the tooth along at least some of the plurality of different directions at different times.

In some embodiments, the method further comprises modifying one or more of the movement velocity or the movement trajectory of the tooth. The modification can be based on one or more additional treatment considerations. The one or more additional treatment considerations can comprise one or more of: improved aesthetics, clinical outcomes, collision avoidance, a biological response to treatment, or feedback data from treatment.

In some embodiments, the method further comprises: determining a plurality of movement stages for repositioning the tooth, based on the movement trajectory and the movement velocity; and fabricating a plurality of orthodontic appliances based on the plurality of movement stages.

In another aspect, one or more non-transitory computer-readable media are provided. The one or more non-transitory computer-readable media can comprise instructions that, when executed by one or more processors, cause the one or more processors to: (a) receive a digital data set representing an initial position and orientation of the tooth; (b) determine a movement trajectory for repositioning the tooth from the initial position and orientation towards a target position and orientation, wherein the movement trajectory comprises movement along a plurality of different directions; and (c) determine a movement velocity for repositioning the tooth along each direction of the plurality of different directions, wherein the movement velocity is determined independently for each direction.

In another aspect, a system for generating a treatment plan for repositioning a plurality of teeth is provided. The system can comprise one or more processors and memory. The memory can comprise instructions that, when executed by the one or more processors, cause the one or more processors to: receive a digital data set representing the plurality of teeth; determine a movement trajectory for repositioning each tooth of the plurality of teeth from an initial position and orientation towards a target position and orientation, wherein the movement trajectory of at least one tooth of the plurality of teeth comprises movement along a plurality of different directions; determine a movement velocity for repositioning each tooth along the corresponding movement trajectory. The movement velocity can be determined independently for each tooth of the plurality of teeth. Alternatively or in combination, the plurality of teeth can be categorized into a plurality of different subgroups (e.g., based on tooth type, tooth characteristics, location in the arch, etc.), and the movement velocity can be determined independently for each subgroup of the plurality of different subgroups. The movement velocity for the at least one tooth can be determined independently for each direction of the plurality of different directions.

In another aspect, a method for generating a treatment plan for repositioning a plurality of teeth is provided. The method can comprise: receiving, using one or more processors, a digital data set representing the plurality of teeth; determining, using the one or more processors, a movement trajectory for repositioning each tooth of the plurality of teeth from an initial position and orientation towards a target position and orientation, wherein the movement trajectory of at least one tooth of the plurality of teeth comprises movement along a plurality of different directions; and determining, using the one or more processors, a movement velocity for repositioning each tooth along the corresponding movement trajectory. The movement velocity can be determined independently for each tooth of the plurality of teeth. Alternatively or in combination, the plurality of teeth can be categorized into a plurality of different subgroups (e.g., based on tooth type, tooth characteristics, location in the arch, etc.), and the movement velocity can be determined independently for each subgroup of the plurality of different subgroups. The movement velocity for the at least one tooth can be determined independently for each direction of the plurality of different directions.

In another aspect, one or more non-transitory computer-readable media are provided. The one or more non-transitory computer-readable media can comprise instructions that, when executed by one or more processors, cause the one or more processors to: receive a digital data set representing the plurality of teeth; determine a movement trajectory for repositioning each tooth of the plurality of teeth from an initial position and orientation towards a target position and orientation, wherein the movement trajectory of at least one tooth of the plurality of teeth comprises movement along a plurality of different directions; and determine a movement velocity for repositioning each tooth along the corresponding movement trajectory. The movement velocity can be determined independently for each tooth of the plurality of teeth. Alternatively or in combination, the plurality of teeth can be categorized into a plurality of different subgroups (e.g., based on tooth type, tooth characteristics, location in the arch, etc.), and the movement velocity can be determined independently for each subgroup of the plurality of different subgroups. The movement velocity for the at least one tooth is determined independently for each direction of the plurality of different directions.

In another aspect, a system for repositioning teeth in a accordance with a treatment plan comprises a plurality of polymeric shell appliances for repositioning the plurality of teeth in accordance with the treatment plan. Each of the plurality of appliances corresponds to a movement stage of the treatment plan, said each of the plurality of appliances comprising a plurality of tooth receiving cavities to move said plurality of teeth in accordance with the treatment plan. The plurality of appliances is arranged to move said each of the plurality of teeth with an independent movement velocity along a corresponding movement trajectory for said each tooth of the plurality of teeth.

In some embodiments, the plurality of appliances is arranged to selectively provide a substantial movement velocity of at least about 25% of a maximum velocity or an insubstantial movement velocity comprising no more than about 0.1% of the maximum velocity for said each tooth.

In some embodiments, said each tooth does not comprise a velocity within a range from about 0.1% of the maximum velocity to about 25% of the maximum velocity of teeth.

In some embodiments, no tooth of the plurality of teeth comprises a velocity within a range from about 0.04% of the maximum velocity to about 40% of the maximum velocity of teeth.

In some embodiments, a first tooth of the plurality of teeth comprises the first velocity from a first movement stage to a last movement stage of the plurality of treatment stages and a second tooth of the plurality of teeth comprises the first velocity and the second velocity from the first movement stage to the last movement stage.

In some embodiments, a number of movement stages for which said each tooth moves along the movement trajectory is determined in response to said velocity and a distance along said trajectory for said each tooth and wherein the number of movement stages differs among the plurality of teeth.

In some embodiments, a portion of the plurality of teeth is not moved substantially for a part of the plurality of movement stages and is moved substantially for another part of the plurality of movement stages.

In some embodiments, each of the plurality of teeth is capable of a maximum movement velocity, the movement velocity comprising a substantial movement velocity corresponding to at least about 25% of the maximum movement velocity, and wherein the plurality of movement stages is arranged to selectively provide the substantial movement velocity or no substantial movement velocity, wherein said no substantial movement velocity comprises no more than about 0.1% of the maximum movement velocity.

In some embodiments, the plurality of movement stages is arranged so as not to define a movement velocity within a range from about 0.1% of the maximum movement velocity to about 25% of the maximum movement velocity for said each of the plurality of teeth.

In some embodiments, no tooth of the plurality of teeth comprises a velocity within a range from about 0.04% of the maximum velocity to about 40% of the maximum velocity for said each of the plurality of teeth.

In some embodiments, a first tooth of the plurality of teeth comprises a substantial velocity from a first movement stage to a last movement stage of the plurality of treatment stages and a second tooth of the plurality of teeth comprises a substantial velocity for a portion of the plurality of movement stages and an insubstantial velocity for another portion of the plurality of movement stages.

In some embodiments, a portion of the plurality of teeth is selected from the group consisting of an upper incisor, a lower incisor, a canine, an upper anterior tooth, and a lower anterior the maximum velocity of the portion of plurality of teeth is within a range from about 0.5 mm per week to about 0.15 mm per week and optionally wherein the portion comprises the insubstantial movement velocity for a plurality of stages and the substantial movement velocity for another plurality of stages.

In some embodiments, a portion of the plurality of teeth is selected from the group consisting of a molar and a premolar and the maximum velocity of each of the portion of plurality of teeth is within a range from about 0.03 mm per week to about 0.3 mm per week and optionally wherein the portion comprises the insubstantial movement velocity for a plurality of stages and the substantial movement velocity for another plurality of stages.

In some embodiments, a portion of the plurality of teeth is selected from the group consisting of an upper incisor, a lower incisor, a canine, an upper anterior tooth and a lower anterior the substantial velocity of the portion of the plurality of teeth is within a range from about 0.1 mm per week to about 0.4 mm per week and optionally wherein the portion comprises the insubstantial movement velocity for a plurality of stages and the substantial movement velocity for another plurality of stages.

In some embodiments, a portion of the plurality of teeth is selected from the group consisting of molars and premolars and the substantial velocity of the portion of the plurality of teeth is within a range from about 0.02 mm per week to about 0.25 mm per week and optionally wherein the portion comprises the insubstantial movement velocity for a plurality of stages and the substantial movement velocity for another plurality of stages.

In some embodiments, the insubstantial movement velocity comprises no more than about 0.001 mm per week and optionally wherein the insubstantial movement velocity comprises no more than about 0.00025 mm per week.

The methods, apparatus and appliances disclosed herein are well suited for use with primary dentition, permanent dentition, implants and combinations thereof. Because each of these types of teeth can move different rates, determining the movement of each tooth independently and appliances manufactured in accordance with different rates of teeth movement can improve treatment. The methods, apparatus and appliances disclosed herein can also be configured to move teeth with a higher velocity in order to close an extraction site.

Turning now to the drawings, FIG. 1 shows a skull 10 with an upper jawbone 22 and a lower jawbone 20. The lower jawbone 20 hinges at a joint 30 to the skull 10. The joint 30 is called a temporomandibular joint (TMJ). The upper jawbone 22 is associated with an upper jaw 101, while the lower jawbone 20 is associated with a lower jaw 100.

A computer model of the jaws 100 and 101 can be generated, and a computer simulation models interactions among the teeth on the jaws 100 and 101. The computer simulation can allow the system to focus on motions involving contacts between teeth mounted on the jaws. The computer simulation can allow the system to render realistic jaw movements which are physically correct when the jaws 100 and 101 contact each other. Further, the model can be used to simulate jaw movements including protrusive motions, lateral motions, and "tooth guided" motions where the path of the lower jaw 100 is guided by teeth contacts rather than by anatomical limits of the jaws 100 and 101. Motions can be determined for one jaw, but may also be determined for both jaws to represent the bite.

Referring now to FIG. 2A, the lower jaw 100 includes a plurality of teeth 102, for example. At least some of these teeth may be moved from an initial tooth arrangement to a subsequent tooth arrangement. As a frame of reference describing how a tooth has been moved, an arbitrary centerline (CL) may be drawn through the tooth 102. With reference to this centerline (CL), each tooth movement may be tracked in orthogonal directions represented by axes 104, 106, and 108 (where 104 is the centerline). The tooth may be rotated about the axis 108 (angulation), axis 106 (proclination), and the axis 104 (rotation) as indicated by arrows 110, 111, and 112, respectively. Additionally, the tooth may be rotated about the centerline. Thus, all possible free-form motions of the tooth can be tracked. These motions include translation (e.g., movement in one or more of the X-axis or Y-axis), rotation (e.g., movement about the Z-axis), intrusion and extrusion (e.g., movement in the Z-axis), or tipping (e.g., movement about one or more of the X-axis or Y-axis), to name a few. In addition to teeth movement, the movement of the gum line 114 may also be tracked using models such as model 100. In some embodiments, the model includes X-ray information of the jaw so that movements of the roots of the teeth can be tracked as well.

FIG. 2B shows how the magnitude of any tooth movement may be defined in terms of a maximum linear translation of any point P on a tooth 102. Each point P1 may undergo a cumulative translation as that tooth is moved in any of the orthogonal or rotational directions defined in FIG. 2A. That is, while the point will usually follow a nonlinear path, there can be a linear distance between any point in the tooth when determined at any two times during the treatment. Thus, an arbitrary point P1 may in fact undergo a true side-to-side translation as indicated by arrow d1, while a second arbitration point P2 may travel along an arcuate path, resulting in a final translation d2. Many aspects of the present disclosure may be defined in terms of the maximum permissible movement of a point P1 induced on any particular tooth. Such maximum tooth movement, in turn, can be defined as the maximum linear translation of that point P1 on the tooth which undergoes the maximum movement for that tooth in any treatment step. In embodiments where the orthodontic treatment includes a temporal series of treatment steps, the tooth velocity can be defined as the maximum movement per treatment step. Each treatment step can be defined as the duration each orthodontic appliance is worn (e.g., 1 to 2 weeks).

The present disclosure provides various orthodontic treatment procedures in which tooth movement is achieved through placement of one or more orthodontic appliances on a patient's teeth. Appliances having teeth receiving cavities that receive and reposition teeth, e.g., via application of force due to appliance resiliency, are generally illustrated with regard to FIG. 3A. FIG. 3A illustrates an exemplary tooth repositioning appliance or aligner 300 that can be worn by a patient in order to achieve an incremental repositioning of individual teeth 302 in the jaw. The appliance can include a shell having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated. e.g., using rapid prototyping fabrication techniques, from a digital model of an appliance.

Although reference is made to an appliance comprising a polymeric shell appliance, the embodiments disclosed herein are well suited for use with many appliances that receive teeth, for example appliances without one or more of polymers or shells. The appliance can be fabricated with one or more of many materials such as metal, glass, reinforced fibers, carbon fiber, composites, reinforced composites, aluminum, biological materials, and combinations thereof for example. The appliance can be shaped in many ways, such as with thermoforming or direct fabrication (e.g., 3D printing, additive manufacturing), for example. Alternatively or in combination, the appliance can be fabricated with machining such as an appliance fabricated from a block of material with computer numeric control machining.

An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some embodiments, some, most, or even all of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 304 on teeth 302 with corresponding receptacles or apertures 306 in the appliance 300 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 3B:
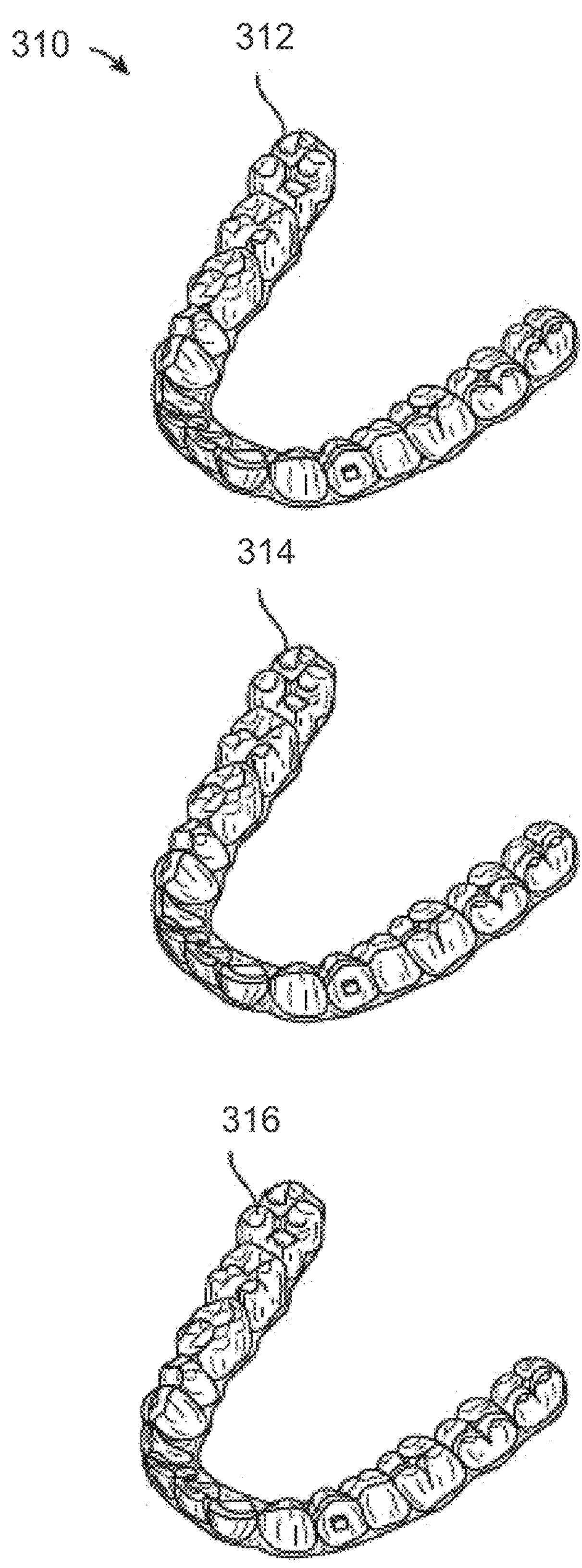
FIG. 3B illustrates a tooth repositioning system, in accordance with embodiments.

FIG. 3B illustrates a tooth repositioning system 310 including a plurality of appliances 312, 314, 316. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 310 can include a first appliance 312 corresponding to an initial tooth arrangement, one or more intermediate appliances 314 corresponding to one or more intermediate arrangements, and a final appliance 316 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

The various embodiments of the orthodontic appliances presented herein can be fabricated in a wide variety of ways. As an example, some embodiments of the appliances herein (or portions thereof) can be produced using indirect fabrication techniques, such as by thermoforming over a positive or negative mold. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell. Alternatively or in combination, some embodiments of the appliances herein may be directly fabricated, e.g., using rapid prototyping, stereolithography, 3D printing, and the like.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled rapid prototyping such as 3D printing, etc.). The computer-based methods presented herein can improve the accuracy, flexibility, and convenience of appliance fabrication.

In some embodiments, orthodontic appliances, such as the appliance illustrated in FIG. 3A, impart forces to the crown of a tooth and/or an attachment positioned on the tooth at one or more points of contact between a tooth receiving cavity of the appliance and received tooth and/or attachment. The magnitude of each of these forces and/or their distribution on the surface of the tooth can determine the type of orthodontic tooth movement which results. Tooth movements may be in any direction in any plane of space, and may comprise one or more of rotation or translation along one or more axes. Types of tooth movements include extrusion, intrusion, rotation, tipping, translation, and root movement, and combinations thereof, as discussed further herein. Tooth movement of the crown greater than the movement of the root can be referred to as tipping. Equivalent movement of the crown and root can be referred to as translation. Movement of the root greater than the crown can be referred to as root movement.

FIG. 3C illustrates a method 320 of orthodontic treatment using a plurality of appliances, in accordance with embodiments. The method 320 can be practiced using any of the appliances or appliance sets described herein. In step 330, a first orthodontic appliance is applied to a patient's teeth in order to reposition the teeth from a first tooth arrangement to a second tooth arrangement. In step 340, a second orthodontic appliance is applied to the patient's teeth in order to reposition the teeth from the second tooth arrangement to a third tooth arrangement. The method 320 can be repeated as necessary using any suitable number and combination of sequential appliances in order to incrementally reposition the patient's teeth from an initial arrangement to a target arrangement. The appliances can be generated all at the same stage or time point, in sets or batches (e.g., at the beginning of one or more stages of the treatment), or one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

The movement rate or velocity at which teeth are repositioned during orthodontic treatment may be varied as desired. As used herein, the movement velocity of a tooth may be defined with respect to the overall velocity of the tooth as a whole, the velocity of a portion of a tooth (e.g., tooth crown or tooth root), and/or the velocity of a point on the tooth (e.g., a point on the tooth crown or a point on the toot root). In some embodiments, some or all of a patient's teeth may be repositioned at the same or similar velocities. Optionally, some or all of a patient's teeth may be repositioned at different velocities. The movement velocity of a tooth throughout the duration of the treatment may be constant. Alternatively, the velocity may vary over the course of treatment (e.g., increasing, decreasing, etc.). In some embodiments, one or more of a patient's teeth may be constrained to move at a certain velocity or within a certain velocity range. e.g., less than a maximum velocity limit and/or greater than a minimum velocity limit.

The target movement velocity for a tooth during orthodontic treatment may be determined in various ways. In some embodiments, the tooth with the largest planned movement distance (the "leading" tooth) sets the maximum movement velocity (e.g., based on the physiological velocity limit for tooth movement), and the movement velocities of all other teeth are determined based on the maximum velocity value. For instance, the leading tooth may be set to move a distance of about 0.25 mm to about 0.3 mm per treatment step, and the other teeth may be constrained to move at velocities no greater than the velocity of the leading tooth. In such embodiments, the movement velocities of the other teeth are set by and thus considered to be "dependent" on the movement velocity of the leading tooth.

In alternative embodiments, the movement velocities for some or all of the patient's teeth are determined independently. For instance, the target movement velocity for each tooth may be determined independently, such that the velocity value for each tooth is not influenced by or based upon the velocity value for any other tooth. Accordingly, the velocity for each tooth can be customized based on the physiological considerations and planned movement specific to that tooth, as discussed in further detail herein. It shall be appreciated that independent determination of movement velocities as described herein does not require that each tooth have a different target velocity, and may optionally result in two or more teeth having the same target velocity, in some embodiments.

Alternatively or in combination, the patient's teeth may be categorized into a plurality of different subgroups, and the movement velocities may be determined independently for each subgroup. For instance, teeth of the same type (e.g., incisors, canines, premolars, molars) may be grouped with each other. As another example, teeth having similar physiological characteristics (e.g., number of roots, location in the arch, tooth diameter, root surface area, root volume, root length, crown surface area, and/or crown volume) may be grouped with each other. The target movement velocity for each subgroup of teeth can be determined independently, such that the velocity value(s) for each tooth within the subgroup is not influenced by or based upon the velocity values of teeth in other subgroups. The velocity values for each tooth within a subgroup may be determined independently of other teeth within the same subgroup, or may depend on (e.g., be the same as) the velocities of other teeth within the same subgroup, as desired. It shall be appreciated that any description herein referring to independent determination of velocities on a tooth-by-tooth basis can also be applied to independent determination of velocities based on subgroups.

In some embodiments, the target movement velocity for a tooth is selected to achieve efficient tooth movement while reducing the risk of patient complications. Moving teeth at higher velocities can be advantageous in terms of improving treatment efficacy and reduce overall treatment time. For example, in some embodiments, it can be difficult to accurately fabricate orthodontic shell appliances programmed to move teeth at relatively low velocities, since the movement distance between each successive tooth arrangement may fall within the error range of manufacturing tolerances. Such inaccuracies in the fabricated appliances can result in low or uncontrolled forces applied to the teeth that reduce the efficacy and predictability of treatment. These shortcomings can be addressed by increasing the velocity of tooth movement. However, excessively high velocities may elicit undesirable side effects such as discomfort, pain, root resorption, or cell death.

Figure 4:
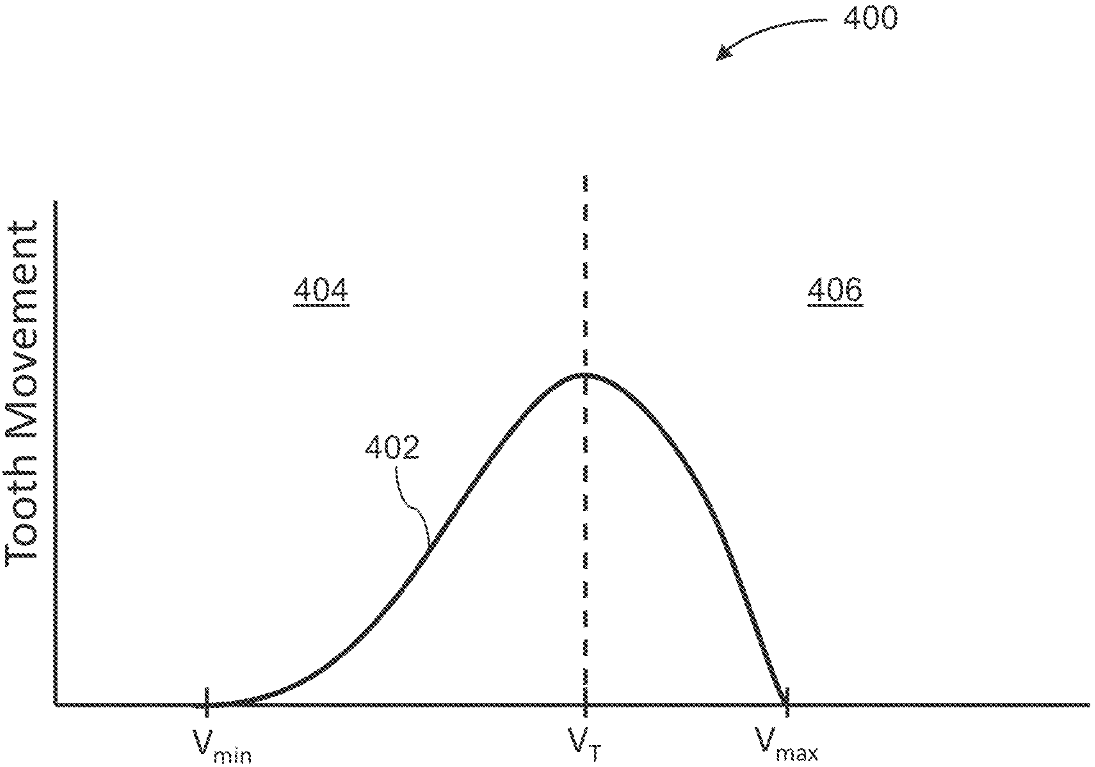
FIG. 4 is a graph schematically illustrating a bell curve representing the relation between programmed tooth velocity and achieved tooth movement, in accordance with embodiments.

FIG. 4 is a graph 400 schematically illustrating a bell curve 402 representing the relation between programmed tooth velocity and achieved tooth movement, in accordance with embodiments. The peak tooth movement corresponds to the maximum velocity that a tooth is capable of achieving for a particular type of tooth movement, and each tooth can be programmed to move with a target velocity corresponding to the peak movement. The programmed tooth velocity can represent the velocity at which the tooth is intended to move during an orthodontic treatment, and can correspond to the amount of programmed tooth movement per treatment step. For example, in the context of orthodontic shell appliances, the programmed tooth velocity can be defined by the distances between corresponding teeth-receiving cavities in successive appliances. The minimum programmed velocity value, $V_{min}$, represents the lower velocity threshold for tooth movement. The maximum programmed velocity value, $V_{max}$, represents the upper velocity threshold at which cell death occurs. In some embodiments, the peak tooth movement is achieved at a programmed target velocity value, $V_T$, and decreases for programmed tooth velocities greater or less than $V_T$. For instance, programmed tooth velocity values less than the target velocity value (e.g., region 404) may result in decreased tooth movement due to low efficacy, while programmed tooth velocity values greater than the target velocity value (e.g., region 406) may result in decreased tooth movement due to complications and side effects such as root resorption. In some embodiments, the orthodontic treatment planning approaches described herein preferentially reposition teeth at or near their target velocity values so as to provide efficient movement while reducing the risk of patient complications.

As described in further detail herein, the preferred target movement velocity for repositioning a tooth may be influenced by one or more factors, including but not limited to patient-specific characteristics, tooth type, movement type, movement direction, treatment considerations, or a combination thereof, as described further herein. In some embodiments, the present disclosure provides methods for orthodontic treatment planning in which a target movement velocity for a tooth is determined based on some or all of these factors. This approach can be used to generate treatment plans in which teeth are repositioned at physiologically appropriate velocities customized to the particular patient and malocclusion, thus improving treatment efficacy and predictability.

In some embodiments, the velocity at which the teeth can be safely and efficiently repositioned may vary from patient to patient, such that different movement velocities are appropriate for different patient types. Accordingly, the present disclosure provides methods in which a target movement velocity is independently determined for each tooth based at least in part on one or more patient-specific characteristics, including but not limited to: age, metabolic rate, bone density, skeletal maturity, periodontal condition, intraoral organism population, saliva composition, saliva characteristics, biomarker concentrations, pregnancy status, obesity status, body mass index (BMI), height, weight, drug use status, medical history, family medical history, genetic factors, gender, ethnicity, or a combination thereof. For instance, patients having a higher basal metabolic rate (e.g., pediatric and adolescent patients that are still growing and have not yet reached skeletal maturity) may exhibit faster bone remodeling compared to patients with lower basal metabolic rates (e.g., adult and geriatric patients that have attained skeletal maturity). Thus, the target tooth movement velocities for patients with higher metabolic rates may be higher than the velocities for patients with lower metabolic rates. A patient's basal metabolic rate can be determined or estimated in various ways. For example, age can be used as a predictor of metabolic rate. In some embodiments, patients are categorized into subgroups based on age (e.g., patients 17 years old or younger are assumed to have a higher metabolic rate, while patients older than 17 years are assumed to have a lower metabolic rate). Alternatively or in combination, the metabolic rate can be estimated based on patient data providing information regarding skeletal maturity (e.g., lateral cephalogram, evaluation of maturation of the cervical vertebrae, evaluation of maturation of the bones and cartilage of the hands and wrist), biomarker concentrations (e.g., from gingival crevicular fluid, saliva, blood, serum), age, height, weight, gender, indirect calorimetry data, heart rate, and the like.

As another example, patient-specific characteristics relating to bone density (e.g., medical history or family medical history of osteoporosis, presence of tooth extraction sites, etc.) may be used to determine the target movement velocity. For instance, a tooth moving into or through an extraction site may have a higher movement velocity than a tooth that is not moving into or through an extraction site. In yet another example, biomarker concentrations (e.g., measured from gingival crevicular fluid, saliva, blood, serum, etc.) can be measured and used to determine the appropriate velocity for tooth repositioning. Examples of biomarkers that can be used include but are not limited to: IL-1α, IL-1β, PGE, ALP, MMPs, TNF-α, RANK, RANKL, M-CSF, and GM-CSF. Other patient-specific factors that may be considered include whether the patient is pregnant, whether the patient is obese, whether the patient is a smoker, and other relevant medical considerations known to those of skill in the art.

Optionally, the target movement velocity may be determined based on the specific characteristics (e.g., size, shape, location relative to extraction sites, etc.) of a patient's tooth. In some embodiments, data indicative of the anatomy and/or physiology of the patient's teeth (e.g., intraoral scan data, CBCT data, ultrasound data, etc.) can be evaluated to determine whether any of the teeth exhibit certain anatomical features or other characteristics that could influence the velocity at which the teeth could be moved, and the target movement velocities for those teeth can be adjusted accordingly. For instance, if CBCT data indicates that the patient's tooth exhibits a hooked shape of the apex of the canine root, the target movement velocity for that tooth can be slowed. Thus, the embodiments herein account for patient-specific and tooth-specific characteristics in the velocity determination.

Alternatively or in combination, the velocity at which a tooth can be safely and efficiently repositioned may vary based on the particular type of tooth such that different movement velocities are appropriate for different tooth types. The present disclosure provides methods in which a target movement velocity is independently determined for each tooth based at least in part on the tooth type. A tooth may be categorized according to one or more of the following tooth types: an incisor, a canine, a premolar, a molar, an anterior tooth, a posterior tooth, a central tooth, a lateral tooth, a single-rooted tooth, a multi-rooted tooth, a primary tooth, a permanent tooth, a partially erupted tooth, a fully erupted tooth, an ectopic tooth, a small-sized tooth, an average-sized tooth, a large-sized tooth, a maxillary tooth, or a mandibular tooth. Tooth size may be quantified according to various metrics, including but not limited to tooth diameter, root surface area, root volume, root length, crown surface area, and/or crown volume. In some embodiments, the tooth size metrics described herein are measured directly from the specific patient, while in other embodiments, the tooth size metrics are approximated based on population averages. Tooth size may be evaluated relative to average values for the population (e.g., the measurements for a "large-sized" tooth are greater than the average, and the measurements for a "small-sized" tooth are smaller than the average).

In some embodiments, the target movement velocity for certain types of teeth (e.g., more easily repositioned types, such as lower incisors, maxillary second premolars) may be higher than the target movement velocity for other types of teeth (e.g., less easily repositioned types, such as lower molars, maxillary first premolars). For example, single-rooted teeth (e.g., incisors, canines, premolars) may be moved at higher velocities than multi-rooted teeth (e.g., molars), since repositioning of single-rooted teeth may involve less bone remodeling compared to multi-rooted teeth. Teeth having shorter roots (e.g., lateral incisors) may be moved at higher velocities than teeth having longer roots (e.g., canines). As another example, the target movement velocity for a tooth can be determined based on the tooth's resistance to movement, also referred to herein as its "anchorage value." The anchorage value may be related to the root surface area or periodontal ligament (PDL) area of the tooth, such that teeth having greater root surface area and PDL area have larger anchorage values. In some embodiments, the target movement velocity is higher for teeth having smaller anchorage values, and is lower for teeth having larger anchorage values. In yet another example, the target movement velocity is greater for relatively narrow and/or small teeth compared to relatively large and/or wide teeth.

Alternatively or in combination, the velocity at which a tooth can be safely and efficiently repositioned may vary based on the type of tooth movement, such that different movement velocities are appropriate for different movement types. The present disclosure provides methods in which a target movement velocity is independently determined for each tooth based at least in part on the movement type. Tooth movements can be categorized according to one or more of the following movement types: a rotational movement, a translational movement, a crown-based movement, a root-based movement, a bodily movement, an uncontrolled tipping movement, a controlled tipping movement, an uprighting movement, a torque movement, an inclination change movement, a first order movement, a second order movement, or a third order movement.

In some embodiments, a first order movement is any movement within or parallel to the occlusal plane; a second order movement is any type of movement along the archform such as angulation; and a third order movement is any movement about the axis of the arch, such as "incisor torque." For instance, in terms of an orthodontic archwire, first order can be in the plane of the flat archwire, second order can be along the length of the archwire, and third order can be rotation about the axis of the archwire. It shall be appreciated that "archwire" as used herein can refer to a reference axis extending along the patient's archform, rather than an actual physical archwire of a wire-and-bracket system, and that the embodiments herein can be practiced in combination with orthodontic appliances that do not utilize any archwires.

As used herein, a "crown movement," "crown-based movement," or "crown-limited movement" may refer to a tooth movement in which the movement of the tooth crown is greater than the movement of the tooth root. As used herein, a "root movement," "root-based movement," or "root-limited movement" may refer to a tooth movement in which the movement of the tooth root is greater than the movement of the tooth crown. As used herein, a "bodily movement" may refer to a tooth movement in which the tooth crown and root move by the same amount, e.g., a purely translational movement. In some embodiments, movement of the tooth crown is relatively fast compared to movement of the tooth root, since the tooth crown moves through air while movement of the tooth root involves bone remodeling. Thus, the target movement velocity for a crown movement may be greater than the target movement velocity for a root movement.

The tooth movement type or type(s) associated with a planned tooth movement can be determined in a variety of ways. A few exemplary approaches are discussed in greater detail below. It shall be appreciated that these techniques, as well as others known to those of skill in the art, can be used in combination with any embodiment of the orthodontic treatment planning methods described herein in order to provide customized movement velocities.

Figure 5:
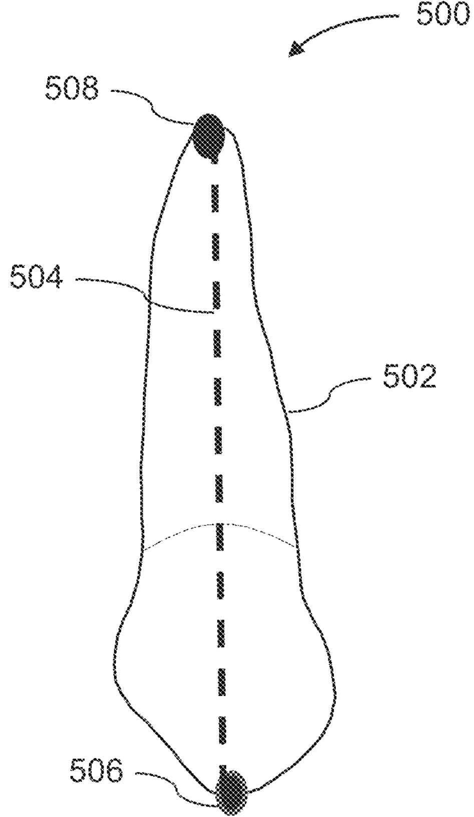
FIG. 5 illustrates a model of a tooth, in accordance with embodiments.

FIG. 5 illustrates a model 500 of a tooth 502, in accordance with embodiments. In the model 500, the tooth 502 is represented as a line segment 504 connecting a crown point 506 and a root point 508. The movement type can be determined by assessing the relative movement velocities of the crown point 506 and root point 508. For example, in some embodiments, a crown movement is associated with a higher relative movement velocity of the crown point 506 versus the root point 508, while a root movement is associated with a higher relative movement velocity of the root point 508 versus the crown point 506.

Figure 6:
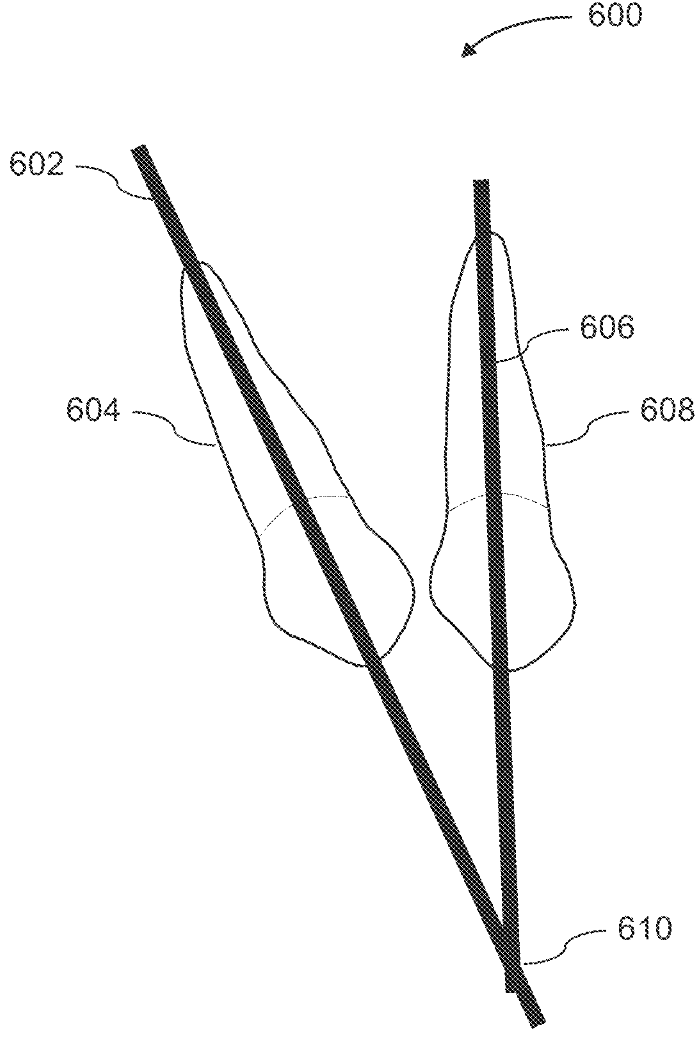
FIG. 6 illustrates a model of a tooth movement, in accordance with embodiments.

FIG. 6 illustrates a model 600 of a tooth movement, in accordance with embodiments. In the model 600, a first line 602 is drawn through the long axis of a tooth in an initial position and orientation 604, and a second line 606 is drawn through the long axis of the tooth in a final position and orientation 608. The location of the intersection 610 between the first line 602 and the second line 606 can be used to characterize the tooth movement type. For instance, in some embodiments, the location of the intersection 610 indicates the proportion of the movement that is a linear displacement versus a rotation. In some embodiments, this proportion covers the entire continuum of possible tooth movements, and the movement types described herein are based on the distinct movements within this continuum. The intersection 610 can represent the axis of rotation for the tooth movement, and the location of the axis of rotation relative to the axis of resistance of the tooth can determine the movement type, as described in detail below with respect to FIGS. 7A through 7D. If the lines 602, 606 do not intersect, this can be indicative of a purely translational movement, for example.

FIGS. 7A through 7D illustrate determination of tooth movement type based on the axis of rotation and axis of resistance, in accordance with embodiments. Although FIGS. 7A through 7D illustrate the axis of rotation and axis of resistance in a single Cartesian direction, one of ordinary skill in the art would appreciate that the techniques described herein can be applied to all three Cartesian directions (x, y, and z) in order to characterize tooth movements in three dimensions.

Figure 7A:
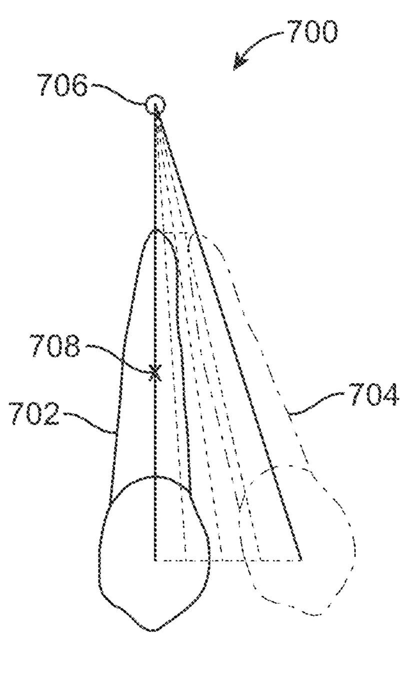
FIG. 7A illustrates a tooth movement type, in accordance with some embodiments.

FIG. 7A illustrates a crown-limited movement 700 from a first position and orientation 702 to a second position and orientation 704. The axis of rotation 706 of the tooth is located above (proximally relative to) the axis of resistance 708 of the tooth, such that the movement of the tooth crown is greater than that of the tooth root. The overall magnitude of the movement can be determined based on the distance between the axis of rotation 706 and axis of resistance 708. A crown-limited movement may be relatively fast compared to other types of tooth movements and may vary inversely proportionally to the magnitude of the distance between the axis of rotation and axis of resistance, in some embodiments.

Figure 7B:
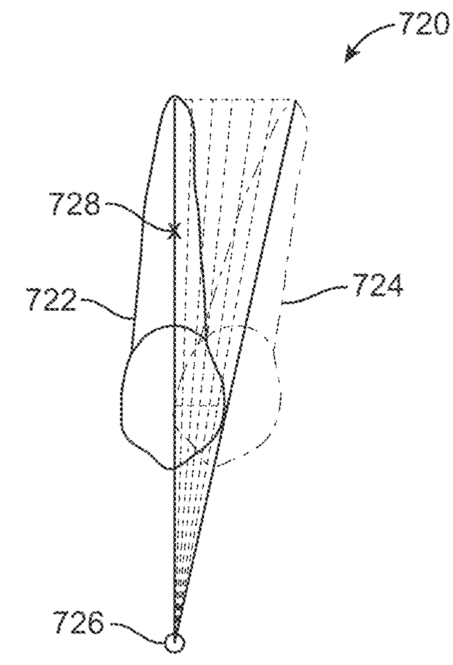
FIG. 7B illustrates a tooth movement type, in accordance with some embodiments.

FIG. 7B illustrates a root-limited movement 720 from a first position and orientation 722 to a second position and orientation 724. The axis of rotation 726 of the tooth is located below (distally relative to) the axis of resistance 728 of the tooth, such that the movement of the tooth root is greater than that of the tooth crown. The overall movement type can be determined based on the distance between the axis of rotation 726 and axis of resistance 728. A root-limited movement may be relatively slow compared to other types of tooth movements, in some embodiments.

Figure 7C:
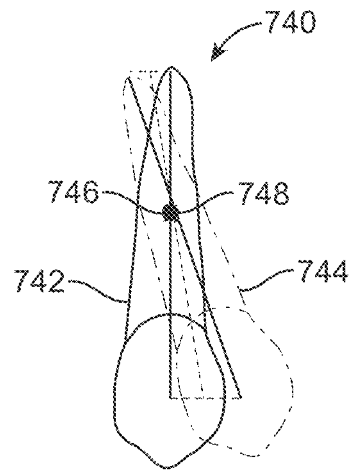
FIG. 7C illustrates a tooth movement type, in accordance with some embodiments.

FIG. 7C illustrates a crown- and root-limited movement 740 from a first position and orientation 742 to a second position and orientation 744. The axis of rotation 746 of the tooth coincides with the axis of resistance 748 of the tooth (zero distance between the axis of rotation 746 and axis of resistance 748). In the depicted embodiment, the movement of the tooth root is less than that of the tooth crown. A crown- and root-limited movement may be relatively fast compared to other types of tooth movements, in some embodiments.

Figure 7D:
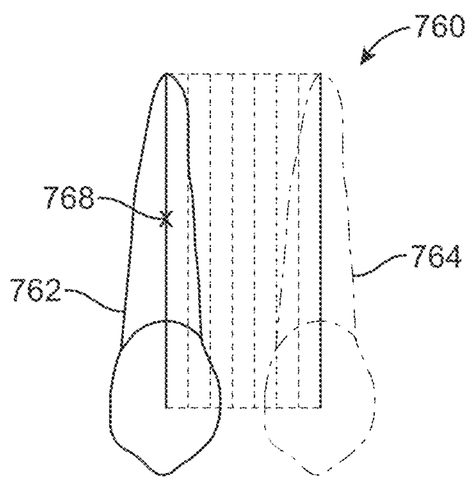
FIG. 7D illustrates a tooth movement type, in accordance with some embodiments.

FIG. 7D illustrates a purely translational root-limited movement 760 from a first position and orientation 762 to a second position and orientation 764, in which the movement of the tooth root is equal to the movement of the tooth crown. Since there is no rotational movement, the distance between the axis of rotation (not shown) and axis of resistance 768 of the tooth is infinite. A purely translational root-limited movement may be relatively slow compared to other types of tooth movements, in some embodiments.

In some embodiments, the distance between the axis of rotation and axis of resistance is determined for each Cartesian direction (e.g., x, y, and z directions), and this distance is used to calculate a rotational velocity value (e.g., maximum or minimum velocity limit, or preferred velocity value) per treatment stage. For example, a small distance between the axis of rotation and axis of resistance can correspond to large rotational velocity (e.g., uncontrolled tipping). A large positive distance (in the direction of the root apex) can correspond to a small rotational velocity (e.g., controlled tipping). A large negative distance (in the direction of the crown tip) can correspond to a small rotational velocity (e.g., root sweep). A very large negative distance or very large positive distance can correspond to a small translational velocity (e.g., bodily translation).

Figure 8:
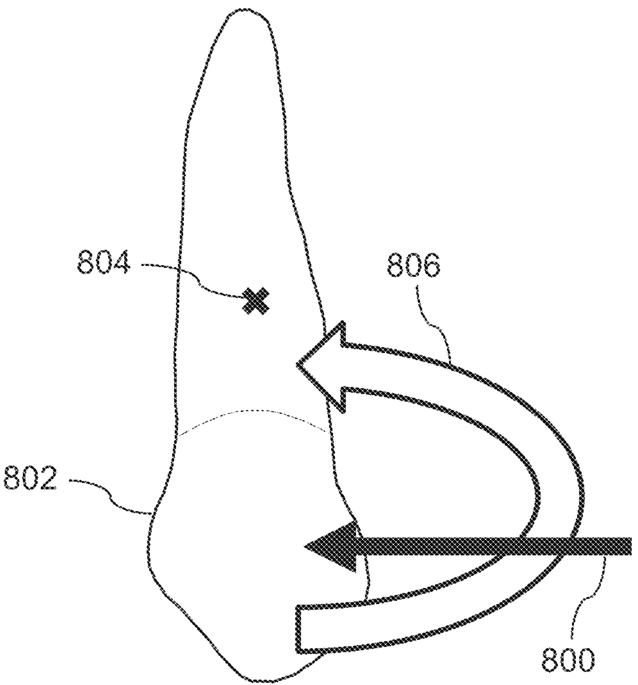
FIG. 8 illustrates determination of tooth movement type based on a moment/force ratio, in accordance with embodiments.

FIG. 8 illustrates determination of tooth movement type based on a moment/force ratio, in accordance with embodiments. A force 800 can be applied to a crown of a tooth 802 (e.g., by an orthodontic appliance) in order to reposition the tooth. The force 800 results in a moment (not shown) about the axis or center of resistance 804 of the tooth 802. A counter moment 806 can be applied to the tooth in order to counter balance the moment produced by the force 800. The ratio of the counter moment 806 to the force 800 can control the type of tooth movement. For example, in some embodiments, application of the force 800 without any counter moment 806 results in uncontrolled tipping, while application of the force 800 in combination with a counter moment 806 results in controlled tipping. In some embodiments, if the counter moment 806 balances the moment produced by the force 800, a translational (bodily) movement is produced. In some embodiments, if the counter moment 806 is greater than the moment produced by the force 800, a root-based movement is produced.

Alternatively or in combination, the velocity at which a tooth can be safely and efficiently repositioned may vary based on the direction of tooth movement, such that different movement velocities are appropriate for different movement directions. The present disclosure provides methods in which a target movement velocity is independently determined for each tooth based at least in part on the movement direction. A tooth can be moved with respect to up to six degree of freedom (three in rotation, three in translation). For example, a tooth can be moved along one or more of the following movement directions: a mesial direction, a distal direction, a buccal direction, a lingual direction, an intrusion direction, an extrusion direction, a rotational direction, a retraction direction, a lateral direction, a transverse direction, a vertical direction, a facial direction, a sagittal direction, an apical direction, or a coronal direction.

Figure 9:
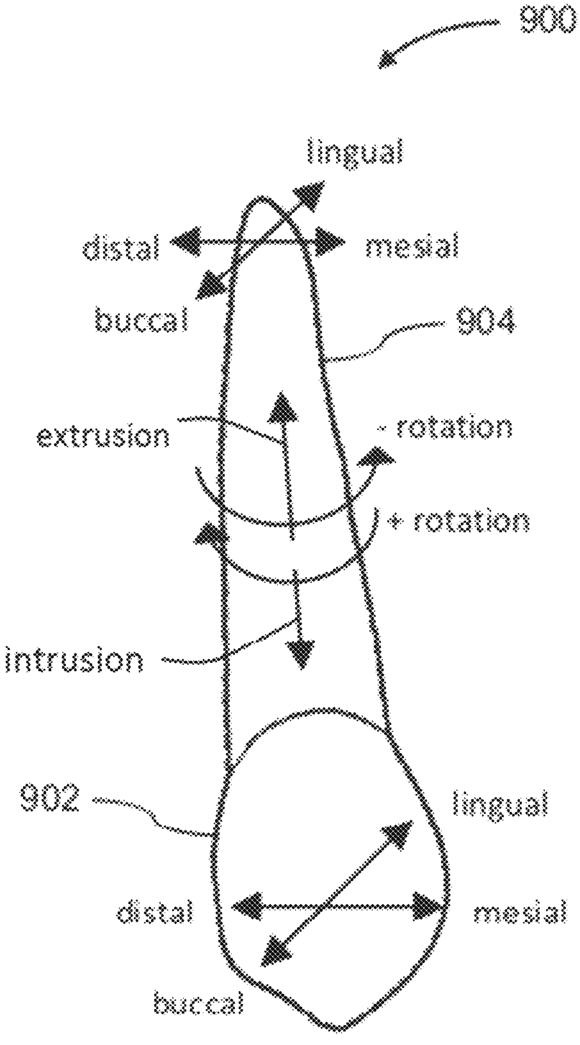
FIG. 9 illustrates movement directions for a tooth, in accordance with embodiments.

FIG. 9 illustrates movement directions for a tooth 900, in accordance with embodiments. The crown 902 of the tooth 900 can be moved along buccal, lingual, mesial, and or distal directions. Similarly, the root 904 of the tooth 900 can be moved along buccal, lingual, mesial, and/or distal directions. Additionally, the entire tooth 900 can be moved along an intrusion direction or extrusion direction. The tooth 900 can also be rotated in a positive direction or negative direction (e.g., as defined according to the right hand rule).

In some embodiments, tooth movement velocities exhibit directional asymmetries, in that tooth movements along different directions may occur at different rates. The target movement velocity for a particular movement direction can be influenced by the physiological considerations associated movement along that direction. For example, the target movement velocity along an extrusion direction may be greater than the target movement velocity along an intrusion direction due to greater bone remodeling involved in intrusive movement. In another example, the target movement velocity along a mesial direction may be greater than the target movement velocity along a distal direction. As another example, crown tipping movements may be faster than translational movements, which in turn may be faster than root tipping movements. In yet another example, the target movement velocity along a buccal direction may be greater than the target movement velocity along a lingual direction.

The embodiments of the present disclosure allow movement velocities to be independently determined for each tooth based on relevant physiological factors, such as the examples described herein (e.g., patient-specific considerations, tooth type, movement type, movement direction). Additionally, by decoupling the velocities of each tooth, movement of each tooth along its respective planned trajectory can be completed independently and asynchronously at different times during orthodontic treatment. In some embodiments, a synchronous treatment plan involves moving all teeth throughout the entire duration of the treatment, such that all teeth reach their final positions and orientations at the same treatment stage (e.g., the final stage), and may be less than ideal for efficient and predictable tooth repositioning. In some embodiments, an asynchronous treatment plan allows for different teeth to be moved over different time periods, and not necessarily for the entire treatment duration, such that different teeth may reach their final positions and orientations at different treatment stages. Rather than synchronizing the movement timing and velocity of each tooth to the timing and velocity of the leading tooth, the asynchronous treatment planning methods described herein permit each tooth to be repositioned along its respective movement trajectory at the target movement velocity for that tooth, thus allowing the tooth to reach its final position and orientation as quickly as possible. Thus, faster and/or shorter tooth movements can be completed earlier in the treatment without waiting for slower and/or longer tooth movements to finish. By driving each tooth to its final position and orientation at an earlier treatment stage, the treatment approaches herein provide additional time for resolving movement lag and/or allowing bone to calcify around the final teeth positions and orientations, which can increase predictability of treatment and improve the overall orthodontic outcome. Additionally, this approach could provide a more efficient distribution of energy in the dental arch for initiating movement at the beginning of treatment, and the embodiments herein permit greater force to be applied to more teeth in the arch at the beginning of treatment. Moreover, in some embodiments, it may be advantageous (e.g., based on clinical considerations) to move certain teeth prior to other teeth, such as to create occlusal anchorage earlier in the treatment. The asynchronous approaches described herein allow such considerations to be incorporated into the treatment plan.

In addition to decoupling the movement velocities of each tooth, the embodiments herein also allow movement velocities to be independently determined for each directional component of a planned tooth movement. In some embodiments, a planned movement trajectory for a tooth involves movement along a plurality of different directions, e.g., two, three, four, five, or more different directions. A tooth can be moved along any combination of the different movement directions described herein. The embodiments herein can be used to determine a target movement velocity for each directional component of movement. The target movement velocity may be the same for some or all of the movement directions, or may differ for some or all of the direction. In some embodiments, the target movement velocity is determined independently for each direction, such that the velocity value for each direction is not influenced by or based upon the velocity value for any other direction. Accordingly, the velocity for each movement direction can be customized based on the specific physiological considerations associated with that direction, as discussed herein. It shall be appreciated that independent determination of directional movement velocities as described herein does not require that each movement direction have a different target velocity, and may optionally result in two or more movement directions having the same target velocity, in some embodiments.

Furthermore, by decoupling the movement velocities for each movement direction, the embodiments herein allow a tooth to be moved along a plurality of different directions independently and asynchronously at different times during treatment, rather than requiring that the tooth be moved simultaneously along each direction. Thus, faster and/or shorter directional movements can be completed earlier in the treatment without waiting for slower and/or longer directional movements to finish, which can be advantageous for lag resolution and treatment predictability as discussed herein. Additionally, in some embodiments, it may be advantageous (e.g., based on clinical considerations) to move a tooth along certain directions before moving the tooth along other directions. For instance, a tooth may be moved along a retraction direction prior to moving along an intrusion direction. As another example, a tooth may be moved along an extrusion direction before moving along a mesial direction. The decoupled directional approaches described herein allow such considerations to be incorporated into the treatment plan.

Figure 10A:
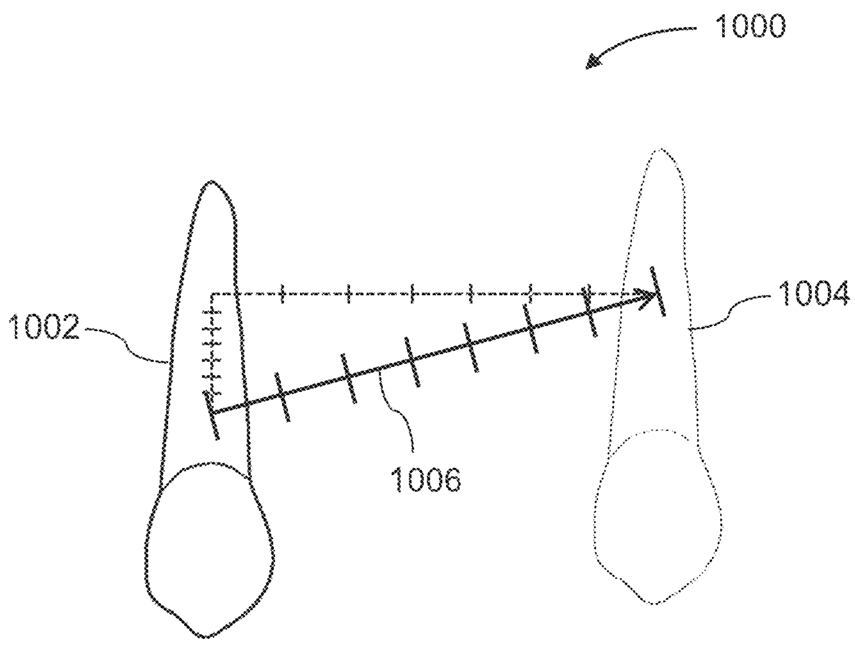
FIG. 10A illustrates a tooth movement with linearly interpolated directional movement components, in accordance with embodiments.

FIG. 10A illustrates a tooth movement 1000 with linearly interpolated directional movement components, in accordance with embodiments. A tooth is moved from an initial position and orientation 1002 to a final position and orientation 1004 along a linearly interpolated movement trajectory 1006. In the depicted embodiment, the movement trajectory 1006 includes movement along an intrusion direction and movement along a mesial direction. Both of these movement components are initiated and completed at the same time, such that the tooth does not arrive at its final position along the intrusion and mesial directions until the final treatment stage.

Figure 10B:
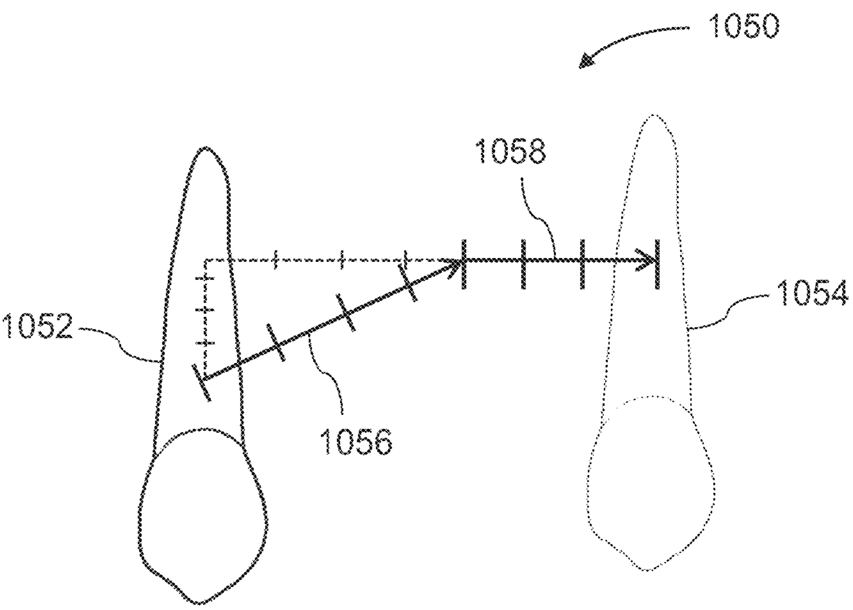
FIG. 10B illustrates a tooth movement with decoupled directional movement components, in accordance with embodiments.

FIG. 10B illustrates a tooth movement 1050 with decoupled directional movement components, in accordance with embodiments. A tooth is moved from an initial position and orientation 1052 to a final position and orientation 1054 along a movement trajectory having a first directional component 1056 and a second directional component 1058. In the depicted embodiment, the first directional component 1056 includes movement along mesial and intrusive directions, and the second directional component 1058 includes movement along a purely mesial direction. The tooth can be moved along the first directional component 1056 before being moved along the second directional component 1058, such that these movements are initiated and completed at different times.

The target movement velocities for the various factors described herein (e.g., patient type, tooth type, movement type, movement direction) can be determined in a variety of ways. In some embodiments, target movement velocities are determined from expert opinion, clinical data, literature values, simulation or modeling, or combinations thereof. For example, clinical data of previously treated patients can be used to determine movement velocity values appropriate for particular combinations of patient types, tooth types, movement types, and/or movement directions. The determined movement velocity value can represent a velocity limit (e.g., maximum or minimum velocity) or preferred velocity for a particular combination of factors. Optionally, the movement velocity can provide a range of potential velocity values for the specified combination. In some embodiments, the determined velocity values are stored in a suitable data structure for use in the treatment planning methods described herein, including but not limited to tables, charts, matrices, lists, data sets, databases, and the like. During treatment planning, the data structure(s) can be accessed by a clinician or treatment planning system in order to identify the appropriate velocity value for a particular patient type, tooth type, movement type, and/or movement direction. In some embodiments, in describing the movement of a tooth with discrete names for movement, there may be a loss of precision. Tooth movements in three-dimensional space occur in along a continuum, and determination of axes of rotation and the velocities about these axes can provides for a more precise tooth movement system.

In some embodiments, a matrix of velocity values is used. Although certain embodiments herein are described with respect to information presented in a matrix format, it shall be appreciated that the information contained in such matrices can alternatively be provided as a chart, table, list, data set, database, or any other suitable data structure or combination thereof. In an exemplary matrix, the rows can represent the tooth type (e.g., tooth identification number according to a standard dental numbering system), the columns can represent the planned movement direction (e.g., crown mesial, crown distal, crown buccal, crown lingual, root mesial, root distal, root buccal, root lingual intrusion, extrusion, positive rotation, negative rotation), and each cell can provide a velocity value or values corresponding to the particular combination of tooth type and movement direction. Alternatively, the rows may represent the movement type and/or direction and the columns may represent the tooth type. In some embodiments, a matrix includes data for any combination of 32 permanent teeth and 12 movement directions for a total of 384 velocity values. In other embodiments, the teeth represented in a matrix are primary teeth. Each velocity value can represent a velocity limit (e.g., maximum and/or minimum velocity) associated with a tooth type and movement direction. The matrix can be used to look up the appropriate velocity limit for a particular tooth type and planned movement direction, and the target movement velocity can be determined based on the velocity limit. For instance, in embodiments where the velocity limit represents a maximum velocity value, the target movement velocity can be less than or equal to the velocity limit.

Although some embodiments herein provide velocity values based on tooth type and movement direction, it shall be appreciated that the data structures such as a matrix can also be used to represent other combinations of factors. For instance, rather than providing velocity values based on tooth type and movement direction, the matrix can be modified to represent other combinations, such as tooth type and movement type, patient type and movement direction, tooth type and patient type, to name a few. Moreover, multi-dimensional matrices and other multi-dimensional data structures can be used to look up velocity values based on any combination of two, three, four, or more of the factors described herein. For example, a three-dimensional matrix of velocity values can enable selection of a velocity value based on tooth type, movement type, and movement direction.

In some embodiments, a plurality of data structures (e.g., a plurality of matrices) is used to represent velocity values for a corresponding plurality of patient types. As discussed herein, different patient types can be differentiated based on patient-specific characteristics such as age, metabolic rate, bone density, skeletal maturity, periodontal condition, intraoral organism population, saliva composition, saliva characteristics, biomarker concentrations, pregnancy status, obesity status, body mass index (BMI), drug use status, medical history, family medical history, genetic factors, gender, ethnicity, or a combination thereof. Thus, each data structure can represent a set of velocity values appropriate for a particular patient type. For instance, a first matrix can provide velocity values for developing patients with relatively high metabolic rates (e.g., pediatric, adolescent patients), and a second matrix can provide velocity values for mature patients with relatively low metabolic rates (e.g., adult, geriatric patients). It shall be appreciated that more any number of data structures of velocity values can be provided, depending on the number of distinct patient types to be considered during treatment planning. In such embodiments, a target movement velocity can be determined by first selecting the data structure corresponding to the particular patient type, and then looking up the velocity value from the selected data structure.

Alternatively or in combination, other methods can be used to incorporate patient-specific characteristics into the velocity value data structure. For instance, a patient-specific characteristic (e.g., age, metabolic rate, bone density, biomarker concentration, drug use status, etc.) can be associated with a modifier value. The modifier value can be applied to some or all of the values in a generalized velocity value data structure (e.g., by multiplication, or any other suitable mathematical function) in order to obtain the patient-specific values. The appropriate modifier value for a particular patient-specific characteristic can be determined based on expert opinion, clinical data, literature values, simulation or modeling, or combinations thereof. The modifier approach can be combined with the other methods herein to provide patient-specific velocity values. For instance, a data structure (e.g., a matrix) corresponding to a first patient characteristic (e.g., age) can be selected, and then a modifier corresponding to a second patient characteristic (e.g., biomarker concentration) can be applied to the selected data structure to generate velocity values specific for the particular combination of patient characteristics for each individual tooth of that patient.

Figure 11:
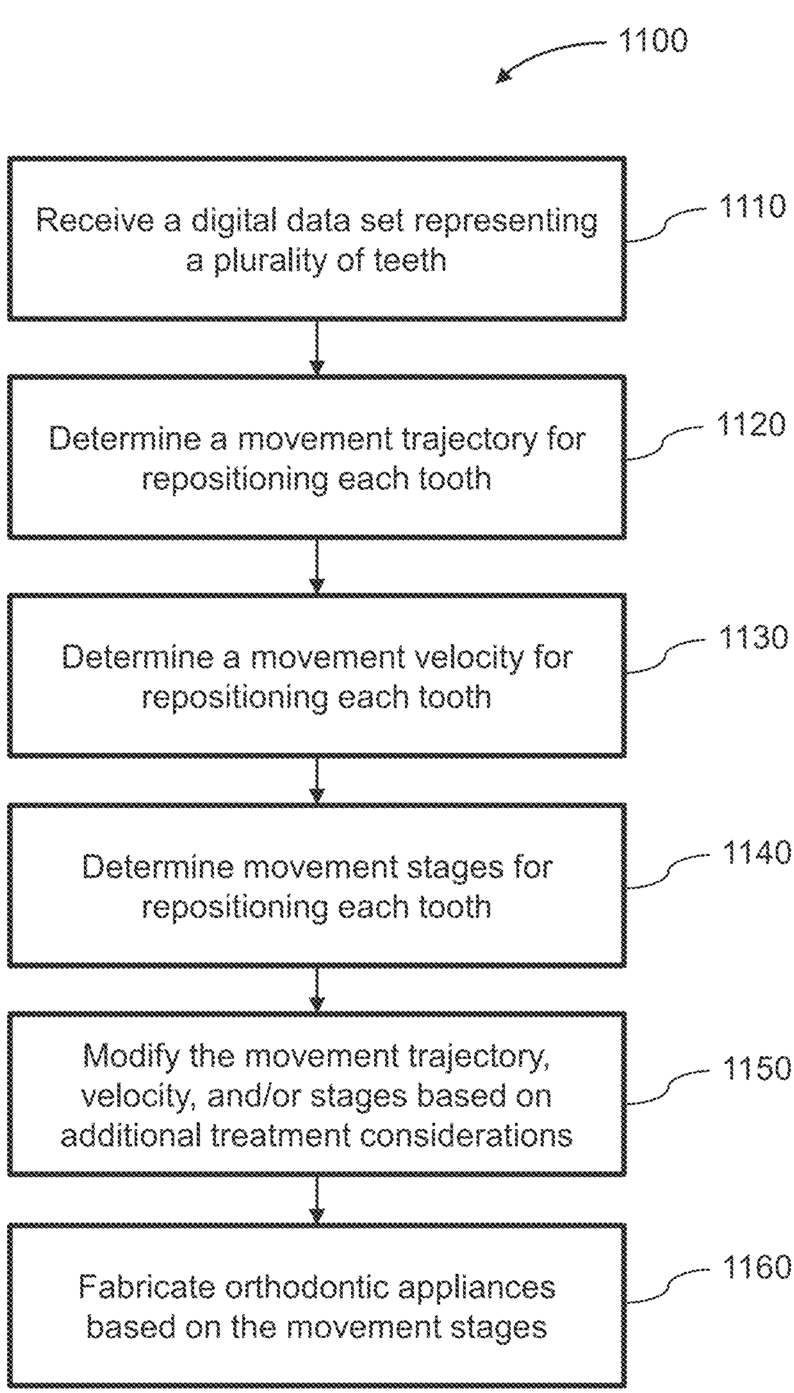
FIG. 11 illustrates a method for generating a treatment plan for repositioning a plurality of teeth, in accordance with embodiments.

FIG. 11 illustrates a method 1100 for generating a treatment plan for repositioning a plurality of teeth, in accordance with embodiments. The method can be performed by any embodiment of the systems and devices described herein, and can be combined with any embodiment of the methods described herein. For example, one or more steps of the method 1100 can be performed by one or more processors of a treatment planning system. The one or more processors can be operably coupled to the memory comprising executable instructions for performing the steps of the method 1100.

In step 1110, a digital data set representing a plurality of teeth is received. The digital data set can represent the patient's teeth in an initial arrangement, e.g., prior to orthodontic treatment. In some embodiments, the digital data set includes surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 1120, a movement trajectory for repositioning each tooth from an initial position and orientation towards a target position and orientation is determined. For example, the movement trajectory can be generated by determining the initial tooth arrangement indicated by the digital data set, determining a target tooth arrangement, and determining movement trajectories of one or more teeth in the initial arrangement to achieve the target tooth arrangement. Each movement trajectory can be optimized, e.g., based on minimizing the total distance moved, minimizing volume of bone remodeled, preventing collisions between teeth, avoiding tooth movements that are more difficult to achieve, or any other suitable criteria. A movement trajectory can include one or more of the tooth movement types described herein, and can involve movement along one or more of the movement directions described herein. The geometry of a tooth movement trajectory may be varied as desired. For example, a movement trajectory may be linear or non-linear (e.g., curved), and may optionally include combination of linear and non-linear segments.

In step 1130, a movement velocity for repositioning each tooth along the corresponding movement trajectory is determined. As discussed above and herein, the movement velocity can be determined independently for each tooth of the plurality of teeth. Alternatively or in combination, the plurality of teeth can be categorized into a plurality of different subgroups, and the movement velocity can be determined independently for each subgroup. The movement velocity can be determined using any embodiment of the methods described herein. For example, step 1130 can involve identifying one or more patient-specific characteristics of the patient to be treated, a tooth type of the tooth to be repositioned, a movement type of the movement trajectory, and/or movement direction of the movement trajectory, and then determining the velocity based on the identified patient-specific characteristic(s), tooth type, movement type, and/or movement direction. In some embodiments, the movement velocity is retrieved from a matrix or other data structure representing target velocity values generated from expert opinion, clinical data, literature values, simulation or modeling, etc. as discussed herein.

In step 1140, movement stages for repositioning each tooth along the corresponding movement trajectory are determined. The movement stages can be incremental repositioning stages of an orthodontic treatment procedure designed to move the patient's teeth from the initial tooth arrangement to the target arrangement. Each movement stage can correspond to an intermediate tooth arrangement between the initial and target arrangements, and the amount of tooth movement between each intermediate arrangement can be determined based on the movement velocities obtained in step 1130. For instance, the movement velocities can be used to determine the number of movement stages as well as the movement distance per stage for repositioning each tooth. In some embodiments, different teeth are moved asynchronously at different times during treatment, such that the number of movement stages for some or all of the teeth may differ.

In step 1150, the movement trajectory, movement velocity, and/or movement stages are modified based on additional treatment considerations. Examples of such additional treatment considerations include but are not limited to: improved aesthetics, clinical outcomes, collision avoidance, a biological response to treatment, or feedback data from treatment. For instance, it may be desirable in some embodiments to move the patient's teeth into a more aesthetic arrangement earlier in the treatment process. Accordingly, the movement trajectories, velocities, and/or stages of one or more teeth may be altered in order to achieve improved aesthetics. As another example, information from previous clinical outcomes may be considered in scheduling the order of tooth movements (e.g., retraction before intruding, extruding before mesializing, creating occlusal anchorage early in treatment), and the treatment plan may be modified in view of such information. In another example, modifications to the movement trajectories, velocities, and/or stages can be made in order to avoid collisions between teeth, e.g., by delaying, slowing, staggering, or round-tripping movements of one or more teeth.

In yet another example, the movement velocities of one or more teeth can be adjusted based on the expected biological response of the patient's teeth to treatment. In some embodiments, a patient's teeth may move at different velocities during different phases of treatment. Tooth movements may be slower at the beginning of treatment prior to the initiation of bone remodeling, for instance. Thus, it may be desirable in some embodiments to adjust the determined movement velocities (e.g., using a multiplier or other modifier) to increase the targeted velocities over time in order to reflect these physiological considerations.

Figure 12:
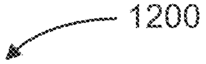
FIG. 12 is a graph schematically illustrating tooth movement at different phases of treatment, in accordance with embodiments.
Figure 12:
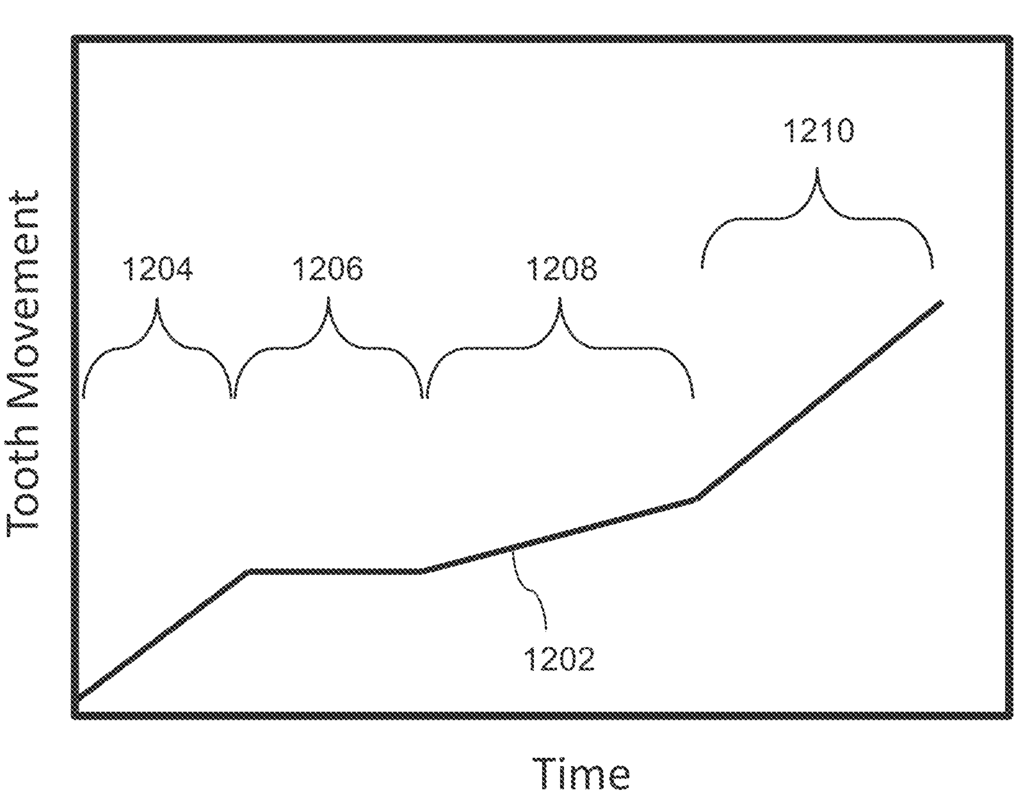

FIG. 12 is a graph 1200 schematically illustrating tooth movement at different phases of treatment, in accordance with embodiments. The graph 1200 includes a curve 1202 depicting the relation between tooth movement and time. In the depicted embodiment, the curve 1202 can be divided into four phases: an initial phase 1204, a lag phase 1206, a first post-lag phase 1208, and a second post-lag phase 1210. A tooth may exhibit some movement during the initial phase 1204 of treatment with an orthodontic appliance. Following the initial phase 1204, the tooth may exhibit a lag phase 1206 in which the appliance produces little or no movement. Once sufficient time has passed for the biological response to occur (e.g., bone remodeling), the tooth may enter a first post-lag phase 1208, in which tooth movement occurs at a relatively slow rate, and then a second post-lag phase 1210, in which tooth movement occurs at a relatively fast rate. In some embodiments, the planned tooth movement velocities for the orthodontic treatment are modified in order to correlate to the expected movement rates for each treatment phase. The planned velocities may also be modified based on the patient response to treatment. For instance, the clinician may adjust the duration each orthodontic appliance is worn in order to effectively modify the movement velocity per time period.

In step 1160, orthodontic appliances are fabricated based on the movement stages. In some embodiments, step 1160 involves generating data (e.g., fabrication instructions) for fabricating a plurality of orthodontic appliances based on the plurality of movement stages, and transmitting the data to a fabrication machine that performs the fabrication step. Any of the orthodontic appliances described herein can be fabricated according to the method 1100. For example, a set of appliances can be fabricated to be sequentially worn by the patient to incrementally reposition the teeth from the initial arrangement to the target arrangement. Some of the appliances can be shaped to accommodate a tooth arrangement specified by one of the movement stages. Alternatively or in combination, some of the appliances can be shaped to accommodate a tooth arrangement that is different from the target arrangement for the corresponding movement stage. As another example, an appliance can be designed in order to apply a specified force system on the teeth and may not have a geometry corresponding to any current or planned arrangement of the patient's teeth.

Optionally, step 1150 can be repeated following step 1160 in order to modify the planned movement trajectory, velocity, and/or stages based on feedback data from patient treatment with the fabricated orthodontic appliances. For example, the planned movement velocities for the teeth can be compared to the actual movement velocities achieved, and the treatment plan can be revised and/or new appliances fabricated if substantial deviations are observed. Furthermore, the feedback data can be used to update the data structures (e.g., matrix) storing information on target movement velocities for use in future treatment planning.

Although the above steps show a method 1100 of generating an orthodontic treatment plan in accordance with embodiments, a person of ordinary skill in the art will recognize many variations based on the teaching described herein. Some or all of the steps may comprise sub-steps. Some or all of the steps may be repeated. One or more steps of the method 1100 may be performed with any suitable treatment planning device or system, such as the embodiments described herein. Some of the steps may be optional, such as one or more of steps 1140, 1150, and 1160. The order of the steps can be varied. For example, steps 1120, 1130, 1140, 1150, and 1160 may be performed in any suitable order.

Figure 13:
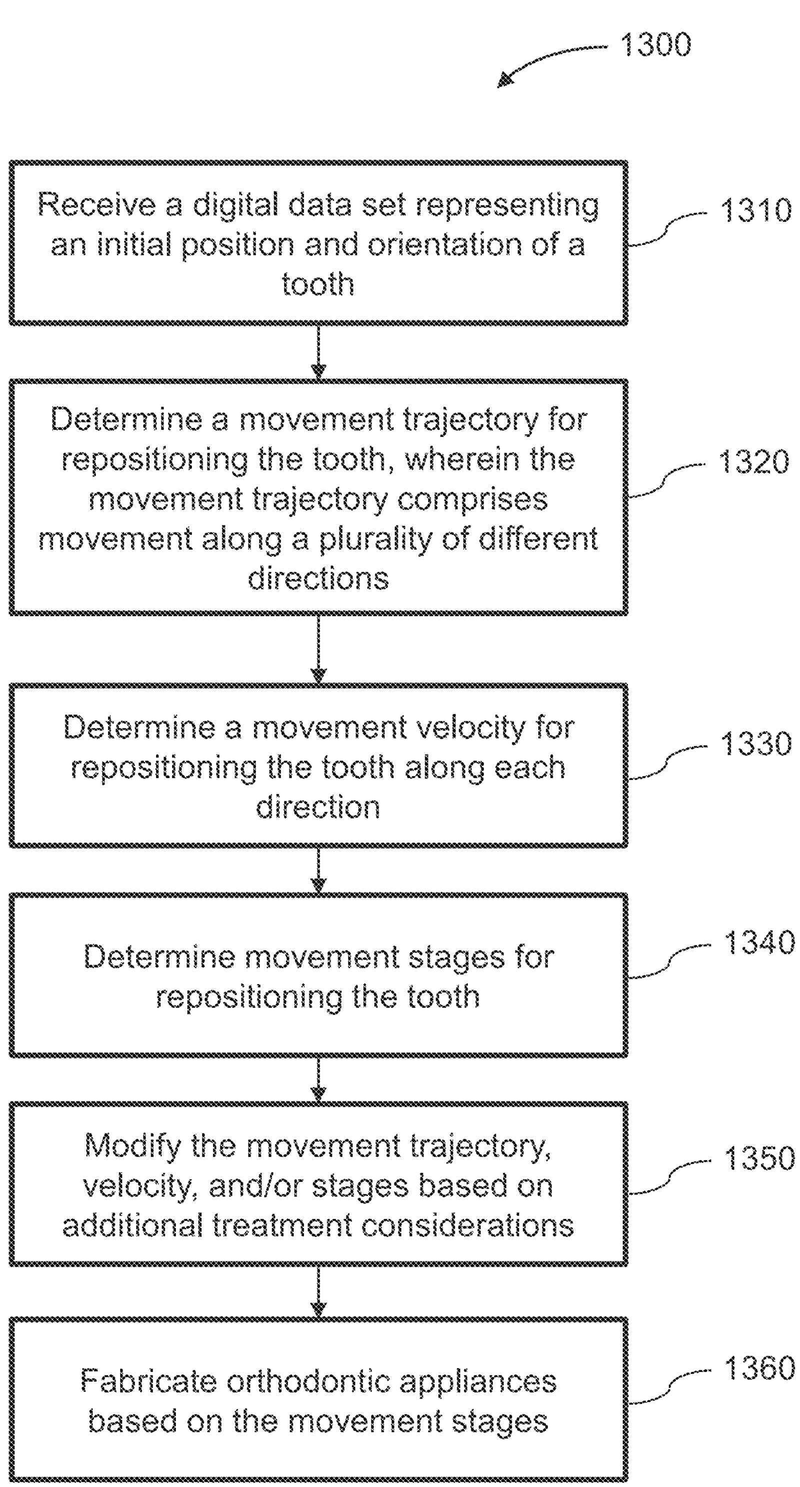
FIG. 13 illustrates a method for generating a treatment plan for repositioning a tooth, in accordance with embodiments.

FIG. 13 illustrates a method 1300 for generating a treatment plan for repositioning a tooth, in accordance with embodiments. The method can be performed by any embodiment of the systems and devices described herein, and can be combined with any embodiment of the methods described herein (e.g., method 1100). For example, one or more steps of the method 1300 can be performed by one or more processors of a treatment planning system. The one or more processors can be operably coupled to the memory comprising executable instructions for performing the steps of the method 1300.

In step 1310, a digital data set representing an initial position and orientation of a tooth is received. The digital data set can represent the tooth in a position and orientation prior to orthodontic treatment. In some embodiments, the digital data set includes surface topography data for the patient's intraoral cavity, as previously discussed with respect to step 1110 of the method 1100.

In step 1320, a movement trajectory for repositioning the tooth from the initial position and orientation towards a target position and orientation is determined. For example, the movement trajectory can be generated by determining the initial tooth position and orientation indicated by the digital data set, determining a target tooth position and orientation, and determining a movement trajectory to achieve the target position and orientation. The movement trajectory can be optimized, e.g., based on minimizing the total distance moved, minimizing volume of bone remodeled, preventing collisions with other teeth, avoiding tooth movements that are more difficult to achieve, or any other suitable criteria. A movement trajectory can include one or more of the tooth movement types described herein, and can involve movement along one or more of the movement directions described herein. The movement trajectory may be linear or non-linear (e.g., curved), and may optionally include combination of linear and non-linear segments. In some embodiments, the movement trajectory involves movement along a plurality of different directions, e.g., two, three, four, five, or more different directions.

In step 1330, a movement velocity for repositioning the tooth along each direction is determined. As discussed above and herein, the movement velocity can be determined independently for each of the different directions. The movement velocity for each direction can be determined using any embodiment of the methods described herein. For example, step 1330 can involve identifying each movement direction of the movement trajectory, and then determining the target velocity based on the identified movement direction. In some embodiments, the movement velocity is obtained from a matrix or other data structure representing target velocity values generated from expert opinion, clinical data, literature values, simulation or modeling, etc. Optionally, the movement velocity can also be determined based on patient-specific characteristics, tooth type, and/or movement type of the planned movement trajectory, as discussed above and herein.

In step 1340, movement stages for repositioning the tooth along the movement trajectory are determined, as discussed above with respect to step 1140 of the method 1100. In some embodiment, the movement velocities obtained in step 1330 are used can be used to determine the number of movement stages as well as the movement distance per stage for repositioning the tooth along each direction. Step 1340 can involve determining a movement schedule for repositioning the tooth along each movement direction. In some embodiments, the tooth is moved asynchronously along different directions at different times during treatment, such that the number of movement stages for movement along some or all of the different directions may differ.

In step 1350, the movement trajectory, movement velocity, and/or movement stages are modified based on additional treatment considerations, as previously discussed with respect to step 1150 of the method 1100.

In step 1360, orthodontic appliances are fabricated based on the movement stages, as previously discussed with respect to step 1160 of the method 1100.

Although the above steps show a method 1300 of generating an orthodontic treatment plan in accordance with embodiments, a person of ordinary skill in the art will recognize many variations based on the teaching described herein. Some or all of the steps may comprise sub-steps. Many of the steps may be repeated. For instance, steps 1310-1350 may be repeated for each of a plurality of teeth in order to generate movement stages for each of the teeth, and the generated movement stages can be used as a basis for fabricating orthodontic appliances, as previously discussed with respect to step 1160 of the method 1100. One or more steps of the method 1300 may be performed with any suitable treatment planning device or system, such as the embodiments described herein. Some of the steps may be optional, such as one or more of steps 1340, 1350, and 1360. The order of the steps can be varied. For example, steps 1320, 1330, 1340, and 1350 may be performed in any suitable order.

In some embodiments, some or all of steps of the method 1300 can be combined with some or all of the steps of the method 1100 and performed by a single system, thus providing independent determination of movement velocities for each tooth and also for each directional component of movement of each tooth. For example, step 1130 of the method 1100 (determining a movement velocity for repositioning each tooth along the corresponding movement trajectory) can be combined with step 1330 of the method 1300 (determining a movement velocity for repositioning a tooth along each direction), such that the movement velocity of each tooth is decoupled and determined independently from other teeth, and the directional velocities of each tooth are also decoupled and determined independently.

Figure 14:
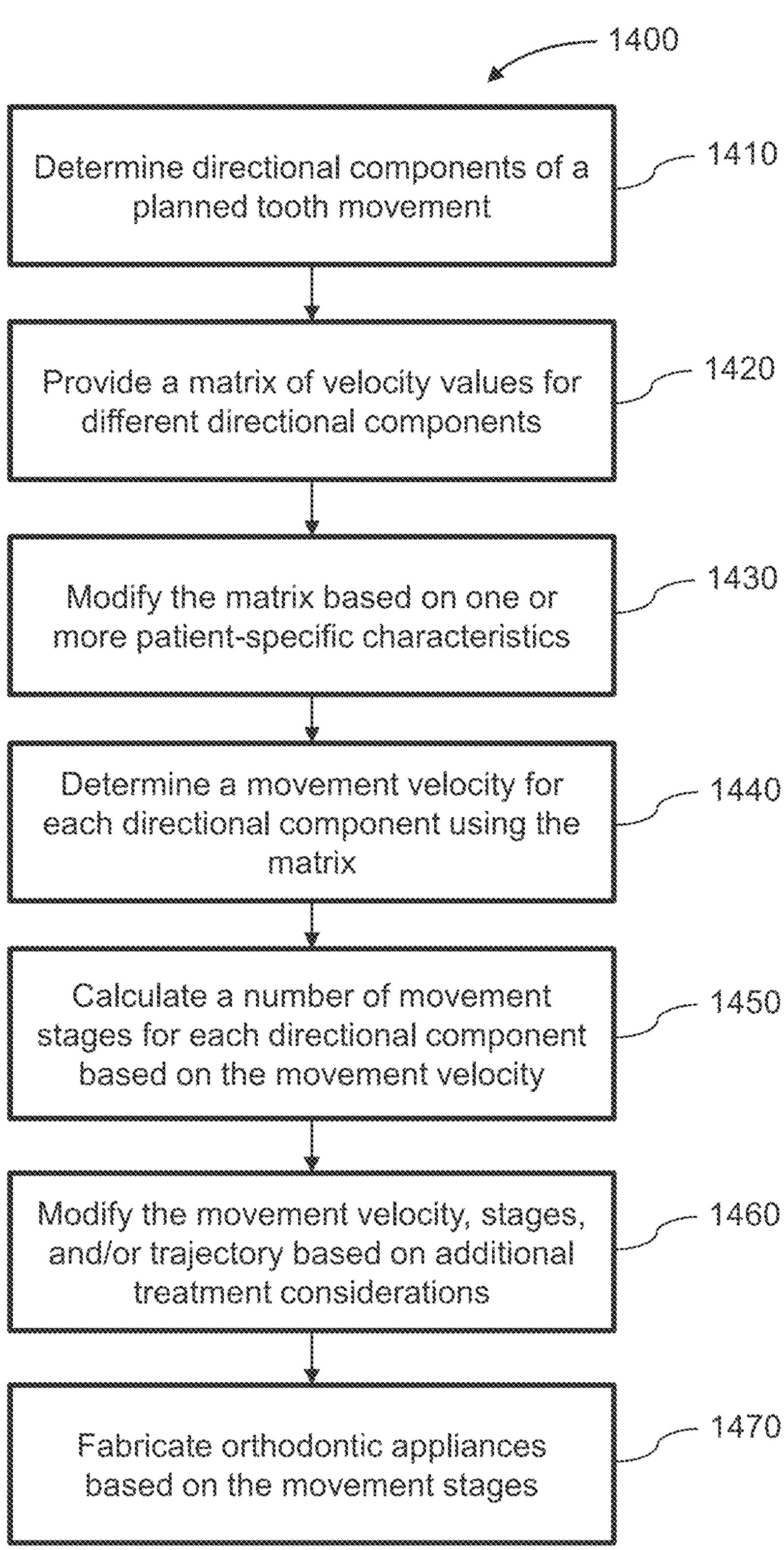
FIG. 14 illustrates a method for generating a treatment plan for repositioning a tooth in accordance with embodiments.

FIG. 14 illustrates a method 1400 for generating a treatment plan for repositioning a tooth, in accordance with embodiments. The method can be performed by any embodiment of the systems and devices described herein, and can be combined with any embodiment of the methods described herein. For example, one or more steps of the method 1400 can be performed by one or more processors of a treatment planning system. The one or more processors can be operably coupled to the memory comprising executable instructions for performing the steps of the method 1300. One or more steps of the method 1400 can be substituted for or performed in combination with one or more steps of the method 1100 or method 1300.

In step 1410, the directional components of a planned tooth movement are determined. The planned tooth movement can be defined as part of a planned tooth movement trajectory, as previously described with respect to step 1120 of the method 1100. The directional components can include any of the movement directions described herein, such as one or more of a crown mesial component, a crown distal component, a crown buccal component, a crown lingual component, a root mesial component, a root distal component, a root buccal component, a root lingual component, an intrusion component, an extrusion component, a positive rotation component, or a negative rotation component. Alternatively or in combination, the directional components can be determined with respect to Cartesian coordinates (x, y, z) with up to six degrees of freedom of movement.

In step 1420, a matrix of velocity values for different directional components is provided. In alternative embodiments, other data structures providing a representation of velocity values for different directional components can be used instead of a matrix, as previously described. The values stored in the matrix (or other data structure) can be generated based on expert opinion, clinical data, literature values, simulation or modeling, or combinations thereof.

In step 1430, the matrix (or other data structure) is optionally modified based on one or more patient-specific characteristics. For instance, the modification can be applied to the velocity values in the matrix in order to account for patient age, metabolic rate, bone density, biomarker concentration, or any other factor or combination of physiological factors discussed herein. The modification can be implemented as a multiplier that is applied to the velocity values in the matrix (or other data structure), for example.

In step 1440, a movement velocity is determined for each directional component using the matrix (or other data structure). For example, the velocity values in the matrix can indicate a maximum or minimum velocity limit, velocity range, or target velocity for tooth movement along a specified directional component.

In step 1450, a number of movement stages is calculated for each directional component, based on the movement velocity obtained in step 1440. As previously discussed, each movement stage can correspond to an intermediate tooth arrangement for repositioning teeth from an initial to a target position. In some embodiments, the time per movement stage is set to a predetermined value (e.g., one to two weeks). Accordingly, the movement velocity can be used to determine the movement distance per movement stage, and thus the total number of stages to move the tooth from the initial to target position and/or orientation.

In step 1460, the movement velocity, movement stages, and/or movement trajectory are modified based on additional treatment considerations, as previously discussed with respect to step 1150 of the method 1100.

In step 1470, orthodontic appliances are fabricated based on the movement stages, as previously discussed with respect to step 1160 of the method 1100.

Although the above steps show a method 1400 of generating an orthodontic treatment plan in accordance with embodiments, a person of ordinary skill in the art will recognize many variations based on the teaching described herein. Some or all of the steps may comprise sub-steps. Many of the steps may be repeated. For instance, steps 1410-1450 may be repeated for each of a plurality of teeth in order to generate movement stages for each of the teeth, and the generated movement stages can be used as a basis for fabricating orthodontic appliances, as previously discussed. One or more steps of the method 1400 may be performed with any suitable treatment planning device or system, such as the embodiments described herein. Some of the steps may be optional, such as steps 1420, 1430, 1460, and 1470. The order of the steps can be varied. For example, steps 1410, 1420, and 1430 may be performed in any suitable order.

Figure 15:
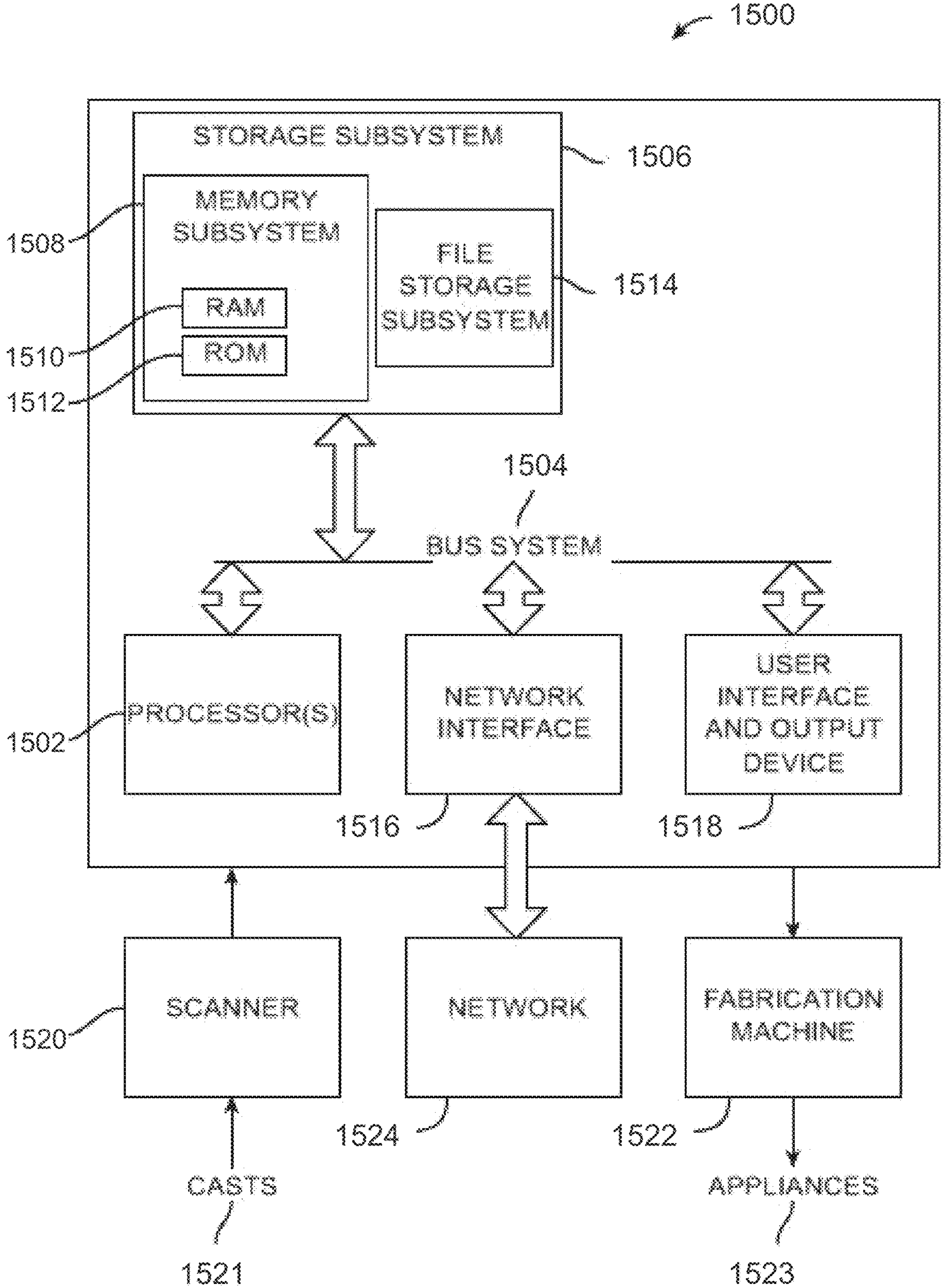
FIG. 15 is a simplified block diagram of a data processing system, in accordance with embodiments.

FIG. 15 is a simplified block diagram of a data processing system 1500 that may be used in executing methods and processes described herein. The data processing system 1500 typically includes at least one processor 1502 that communicates with one or more peripheral devices via bus subsystem 1504. These peripheral devices typically include a storage subsystem 1506 (memory subsystem 1508 and file storage subsystem 1514), a set of user interface input and output devices 1518, and an interface to outside networks 1516. This interface is shown schematically as "Network Interface" block 1516, and is coupled to corresponding interface devices in other data processing systems via communication network interface 1524. Data processing system 1500 can include, for example, one or more computers, such as a personal computer, workstation, mainframe, laptop, and the like.

The user interface input devices 1518 are not limited to any particular device, and can typically include, for example, a keyboard, pointing device, mouse, scanner, interactive displays, touchpad, joysticks, etc. Similarly, various user interface output devices can be employed in a system of the invention, and can include, for example, one or more of a printer, display (e.g., visual, non-visual) system/subsystem, controller, projection device, audio output, and the like.

Storage subsystem 1506 maintains the basic required programming, including computer readable media having instructions (e.g., operating instructions, etc.), and data constructs. The program modules discussed herein are typically stored in storage subsystem 1506. Storage subsystem 1506 typically includes memory subsystem 1508 and file storage subsystem 1514. Memory subsystem 1508 typically includes a number of memories (e.g., RAM 1510, ROM 1512, etc.) including computer readable memory for storage of fixed instructions, instructions and data during program execution, basic input/output system, etc. File storage subsystem 1514 provides persistent (non-volatile) storage for program and data files, and can include one or more removable or fixed drives or media, hard disk, floppy disk, CD-ROM, DVD, optical drives, and the like. One or more of the storage systems, drives, etc may be located at a remote location, such coupled via a server on a network or via the internet/World Wide Web. In this context, the term "bus subsystem" is used generically so as to include any mechanism for letting the various components and subsystems communicate with each other as intended and can include a variety of suitable components/systems that would be known or recognized as suitable for use therein. It will be recognized that various components of the system can be, but need not necessarily be at the same physical location, but could be connected via various local-area or wide-area network media, transmission systems, etc.

Scanner 1520 includes any means for obtaining a digital representation (e.g., images, surface topography data, etc.) of a patient's teeth (e.g., by scanning physical models of the teeth such as casts 1521, by scanning impressions taken of the teeth, or by directly scanning the intraoral cavity), which can be obtained either from the patient or from treating professional, such as an orthodontist, and includes means of providing the digital representation to data processing system 1500 for further processing. Scanner 1520 may be located at a location remote with respect to other components of the system and can communicate image data and/or information to data processing system 1500, for example, via a network interface 1524. Optionally, system 1500 can include other input sources for obtaining patient data (e.g., CBCT data, ultrasound data, etc.). Fabrication system 1522 fabricates appliances 1523 based on a treatment plan, including data set information received from data processing system 1500. Fabrication machine 1522 can, for example, be located at a remote location and receive data set information from data processing system 1500 via network interface 1524.

Figure 16:
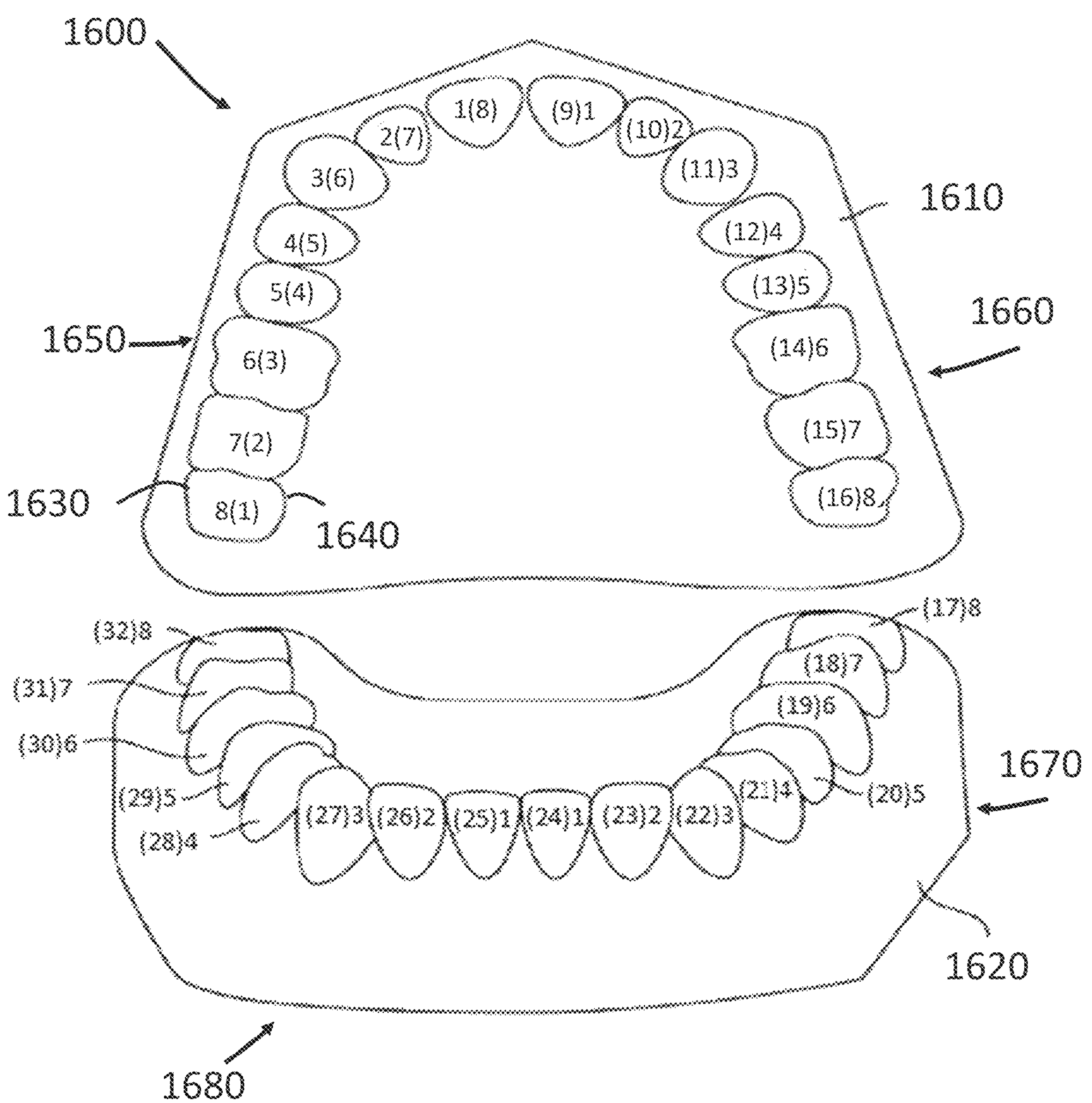
FIG. 16 illustrates two systems for numbering teeth, in accordance with embodiments.

FIG. 16 illustrates known jaw and dental numbering systems 1600 that can be used to identity the teeth to be moved with movement stages as described herein. The numbering systems can be applied to the teeth in the upper jaw or the maxilla 1610 and the teeth in the lower jaw or the mandible 1620. The numbers located along the circumference of buccal surface 1630 are from the Palmer Notation Numbering System. The mouth of the patient is divided into four quadrants: the right upper jaw 1650, the left upper jaw 1660, the left lower jaw 1670, and the right lower jaw 1680. Numbers 1-8 are used to identify the teeth in each quadrant. Number 1 is the incisor. The numbers may continue to the back up to tooth number 9, which is the third molar (if present). An alternative dental numbering system is the Universal Numbering System. The numbers located along the circumference of lingual surface 1640 (also demarcated by parenthesis). Tooth number 1 is the tooth farthest back on the right side 1650 of the mouth. Tooth number 16 is the tooth farthest back on the top left side 1660 of the mouth. Tooth number 17 is the tooth farthest back on the bottom left side 1670 of the mouth. Tooth number 32 is the tooth farthest back on the bottom right side 1680 of the mouth. Reference is made to the Palmer Notation Numbering System and the Universal Numbering System throughout the discussion herein.

Figure 17:
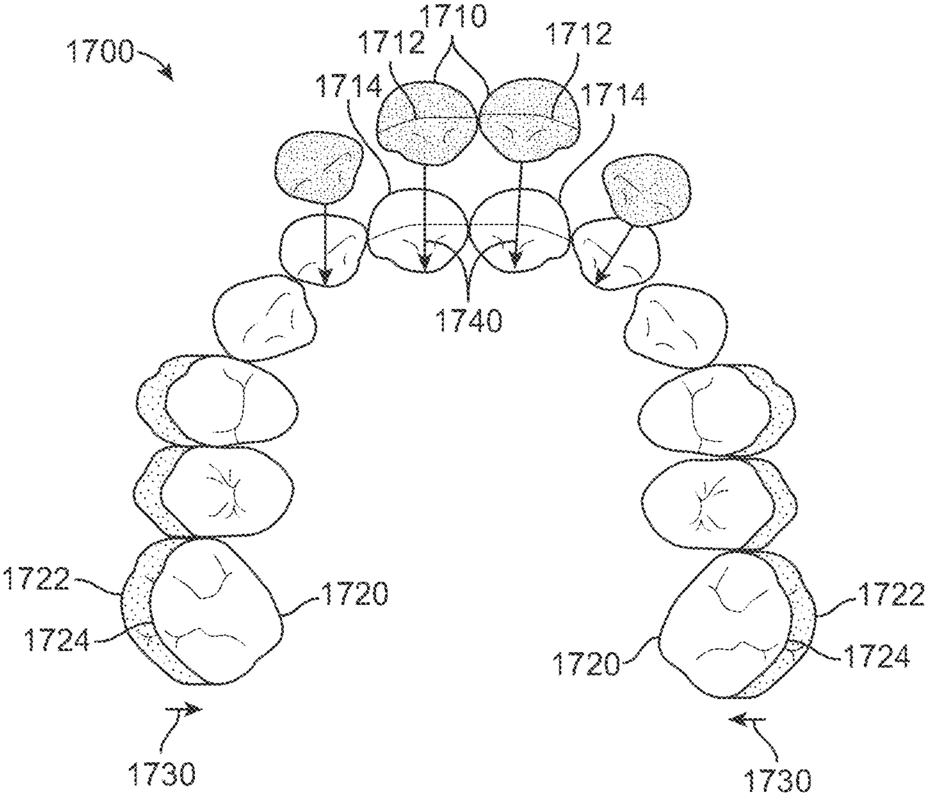
FIG. 17 illustrates movement directions for teeth, in accordance with embodiments.

FIG. 17 illustrates the movement direction of and order teeth undergoing the treatment as described herein. In some embodiments, it may be advantageous (e.g., based on clinical considerations) to move certain teeth prior to other teeth, such as to create occlusal anchorage earlier in the treatment. The asynchronous approaches described herein allow such considerations to be incorporated into the treatment plan. The plurality of teeth moved in accordance with the treatment plan may comprise a plurality of incisors 1710 and a plurality of molars 1720. The plurality of molars 1720 can be moved along a plurality of trajectories 1730 from a first plurality of locations 1722 to a second plurality of locations 1724. The plurality of incisors can be moved along a plurality of trajectories 1740 from a first plurality of locations 1712 to a second plurality of locations 1714. The distance of each of the plurality of trajectories 1730 of the molars can be less than the distance of each of the plurality of trajectories 1740 of the incisors 1710. The smaller movements of the plurality of molars are completed prior to the plurality of incisors, so as to provide occlusal anchorage. The larger movements of the trajectories of the plurality of incisors are completed after the movements of the plurality of molars. For each of the movements of the molars and incisors, the size of the movement and the velocity of the movement are independent.

FIG. 18 illustrates the movement stages for treating teeth in accordance with embodiments. The treatment plan comprises of a plurality of movements stages for each tooth of the plurality of teeth. The initial position of each tooth corresponds to Stage 0. Each of the plurality of teeth moves at an individual velocity through the movement stages as described herein. Each of the plurality of teeth can continue movement through a different number of stages and can stop movement at its final position as determined by the treatment plan. The number of stages required for complete the trajectory of the movement plan can be different for each tooth. Therefore some of the teeth may comprise no substantial movement at some of the stages and substantial movement at other stages as described herein. This use of treatments in which each tooth has substantial movement or insubstantial movement for the plurality of treatment stages can allow better control of tooth movement with more predictable treatment.

Each of the stages can be two weeks apart, and the amount of tooth movement between each stage corresponding to the velocity of the tooth in mm per week. Alternatively, the stages can be one week apart, 15 days apart, one month apart or any appropriate interval and the differences in the locations and orientations of the plurality of teeth receiving cavities of each appliance determined accordingly so as to provide the velocity along the trajectory as described herein.

The total number of stages of the example of FIG. 18 comprises 9 movement stages, corresponding to 9 treatment appliances. The number of movement stages for each tooth, however, is determined based on the type of tooth, the movement trajectory, the maximum velocity along the movement trajectory and other parameters as described herein. Each of the plurality of teeth receiving cavities of each appliance is sized and shaped to provide the tooth movement corresponding to the stage of treatment for the appliance. Tooth 7(2) undergoes 3 movement stages from stages 0 to stage 3. This tooth can be held in the position of stage 3 for stages 4-9 and has no substantial movement at these 6 non-movement stages. Tooth 6(3) undergoes 4 movement stages from stage 0 to stage 4. This tooth can be held in the position of stage 4 for stages 5-9 and has no substantial movement at these 5 non-movement stages. Tooth 4(5) undergoes 3 movement stages from stage 0 to stage 3. This tooth can be held in the position of stage 3 for stages 4-9 and has no substantial movement at these 6 non-movement stages. Tooth 3(6) undergoes 5 movement stages from stage 0 to stage 5. This tooth can be held in the position of stage 5 for stages 6-9 and has no substantial movement at these 4 non-movement stages. Tooth 2(7) undergoes 6 movement stages from stage 0 to stage 6. This tooth can be held in the position of stage 6 for stages 7-9 and has no substantial movement at these 3 non-movement stages. Tooth 1(8) undergoes 9 movement stages from stage 0 to stage 9. Tooth 1(9) undergoes 3 movement stages from stage 0 to stage 3. This tooth can be held in the position of stage 3 for stages 4-9 and has no substantial movement at these 6 non-movement stages. Tooth 2(10) undergoes 9 movement stages from stage 0 to stage 9. Tooth 3(11) undergoes 7 movement stages from stage 0 to stage 7. This tooth can be held in the position of stage 7 for stages 8-9 and has no substantial movement at these 2 non-movement stages. Tooth 4(12) undergoes 3 movement stages from stage 0 to stage 3. This tooth can be held in the position of stage 3 for stages 4-9 and has no substantial movement at these 5 non-movement stages. Tooth 6(14) undergoes 6 movement stages from stage 0 to stage 6. This tooth can be held in the position of stage 6 for stages 7-9 and has no substantial movement at these 3 non-movement stages. Tooth 7(15) undergoes 3 movement stages from stage 0 to stage 3. This tooth can be held in the position of stage 3 for stages 4-9 and has no substantial movement at these 6 non-movement stages. Staging for tooth 5(13) is not shown because this tooth has been extracted in this example. A person of ordinary skill in the art will recognize that the staging shown in FIG. 18 pertains to specific staging of teeth by way of example, and that the specific staging can be varied based on individual parameters and types of tooth movement. For example, some of the teeth can be moved in different orders, some of the teeth can be moved after other teeth as described herein. Some of the teeth can comprise different types of movement in sequence, for example tipping followed by intrusion or extrusion.

The treatment plan for each of a plurality of teeth comprises a plurality of movement stages. The plurality of teeth receiving cavities of the plurality of movement stages can be arranged to selectively provide a first velocity of at least about 25% of the maximum velocity or a second velocity of no more than about 0.1% of the maximum velocity for each tooth. In some embodiments, each tooth of a plurality of teeth does not comprise a velocity within a range from about 0.1% of the maximum velocity to about 25% of the maximum velocity, for example. In some embodiments, each tooth of a plurality of teeth does not comprise a velocity within a range from about 0.04% of the maximum velocity to about 40% of the maximum velocity, and this range may comprise a range of excluded velocities.

One of ordinary skill in the art will understand teeth can be moved at varying velocities in accordance with the type of tooth and type of movement as described herein. The target velocity of the tooth may comprise a maximum velocity that the tooth is capable of being moved as described herein. A portion of the plurality of teeth can be selected from the group consisting of an upper incisor, a lower incisor, a canine, an upper anterior tooth and a lower anterior and the maximum velocity within a range from about 0.15 mm per week to about 0.5 mm per week. A portion of the plurality of teeth can be selected from the group consisting of molars and premolars and the maximum velocity is within a range from about 0.03 mm per week to about 0.3 mm per week, for example. Tooth velocities that can be used in accordance with embodiments and modeling of tooth velocities suggest that the independent target velocity of the tooth can be within range from about 0.15 to about 0.35 mm per week for a tooth selected from the group consisting of an upper incisor, a lower incisor, a canine, an upper anterior tooth and a lower anterior the maximum velocity, for example. The independent target velocity of a tooth can be within a range from about 0.02 mm per week to about 0.25 mm per week for a posterior tooth selected from the group consisting of a molar and a premolar, for example. The insubstantial movement velocity may comprise no more than about 0.001 mm per week, and may comprise no more than about 0.00025 mm per week, for example.

The staging can be configured so as to selectively provide a substantial movement velocity or an insubstantial movement velocity among the plurality of stages for a given tooth. This approach may have the advantage of not utilizing movement velocities that can result in less than ideal tooth movement. For example, the substantial tooth movement velocity can be programmed with a portion of the plurality of stages and insubstantial movement velocity (e.g., no movement velocity) programmed for another portion of the plurality of stages. The velocity of each tooth can be programmed to move the tooth at an appropriate rate for the tooth for a plurality of stages and then substantially stop movement for a plurality of stages. Alternatively or in combination, the tooth can be programmed to move with no substantial velocity for a first portion of the plurality of stages and to move with the substantial velocity for the second portion of the plurality of stages. Appropriate appliances can be manufactured with teeth receiving cavities shaped and positioned so as to move the teeth with the programmed movements.

As used herein the term "and/or" is used as a functional word to indicate that two words or expressions are to be taken together or individually. For example, A and/or B encompasses A alone, B alone, and A and B together.

While preferred embodiments of the present disclosure have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. A system comprising:

a fabrication machine; and a digital device comprising:

one or more processors; and memory communicatively coupled to the one or more processors, wherein the memory comprises instructions that, when executed by the one or more processors, cause the one or more processors to:

receive, by the one or more processors, a digital data set representing an initial tooth arrangement of a plurality of teeth;

identify, by the one or more processors, a target planned tooth arrangement;

determine, by the one or more processors, a linear movement trajectory for repositioning at least one tooth of the plurality of teeth along a line from an initial position and orientation in the initial tooth arrangement towards a target position and orientation in the target planned tooth arrangement over a plurality of stages, wherein the linear movement trajectory is based at least in part on the digital data set and the target planned tooth arrangement, the linear movement trajectory including a first directional component and a first movement velocity along the first direction component and a second directional component and a second movement velocity along the second direction component, wherein the first directional component and the second directional component are orthogonal to each other;

determine, by the one or more processors, that the first movement velocity is less than a target velocity;

increase, by the one or more processors, the first movement velocity along the first directional component for a first one or more stages of the plurality of stages;

generate, by the one or more processors, a treatment plan, the treatment plan moving the at least one tooth along the first directional component at the increased first movement velocity and the second directional component at the second movement velocity from the initial position and orientation towards the target position and orientation along the first directional component in the first one or more stages of the plurality of stages and moving the at least one tooth along the second directional component towards the target position and orientation in the first one or more stages and a second one or more stages of the plurality of stage along the second directional component; and fabricate, by the fabrication machine, one or more orthodontic appliances to reposition the plurality of teeth based on the treatment plan.

2. The system of claim 1, wherein the increased first movement velocity is determined based on one or more patient-specific characteristics.

3. The system of claim 2, wherein the one or more patient-specific characteristics comprise one or more of: age, metabolic rate, bone density, skeletal maturity, periodontal condition, intraoral organism population, saliva composition, saliva characteristics, biomarker concentrations, pregnancy status, obesity status, body mass index (BMI), or drug use status.

4. The system of claim 1, wherein the increased first movement velocity for said at least one tooth is determined based on a tooth type of said at least one tooth.

5. The system of claim 4, wherein the tooth type comprises one or more of: an incisor, a canine, a premolar, a molar, an anterior tooth, a posterior tooth, a central tooth, a lateral tooth, a single-rooted tooth, a multi-rooted tooth, a primary tooth, a permanent tooth, a partially erupted tooth, a fully erupted tooth, an ectopic tooth, a small-sized tooth, an average-sized tooth, a large-sized tooth, a maxillary tooth, or a mandibular tooth.

6. The system of claim 1, wherein the increased first movement velocity for said at least one tooth is determined based on a movement type of the corresponding movement trajectory of said at least one tooth.

7. The system of claim 6, wherein the movement type comprises one or more of:

a rotational movement, a translational movement, a crown-based movement, a root-based movement, a bodily movement, an uncontrolled tipping movement, a controlled tipping movement, an uprighting movement, an inclination change movement, a first order movement, a second order movement, or a third order movement.

8. The system of claim 1, wherein the first directional component and the second directional component each include one of: a mesial direction, a distal direction, a buccal direction, a lingual direction, an intrusion direction, an extrusion direction, a rotational direction, a retraction direction, a lateral direction, a transverse direction, a vertical direction, a facial direction, a sagittal direction, an apical direction, or a coronal direction.

9. The system of claim 1, wherein the increased first movement velocity is selected from a set of movement velocity values generated based on one or more of expert opinion or clinical data.

10. The system of claim 1, wherein the instructions further cause the one or more processors to determine a distance between an axis of rotation and an axis of resistance of said at least one tooth, wherein the increased first movement velocity of said at least one tooth is determined based on the distance between the axis of rotation and the axis of resistance.

11. The system of claim 1, wherein the instructions further cause the one or more processors to modify one or more of the increased first movement velocity and the movement trajectory of at least one tooth of the plurality of teeth, wherein the modification is based on one or more additional treatment considerations.

12. The system of claim 11, wherein the one or more additional treatment considerations comprises one or more of: improved aesthetics, clinical outcomes, collision avoidance, a biological response to treatment, or feedback data from treatment.

13. The system of claim 1, wherein said at least one tooth of the plurality of teeth is capable of a maximum movement velocity, the increased first movement velocity is a substantial movement velocity that corresponds to at least 30% of the maximum movement velocity, and wherein the first one or more stages and the second one or more stages of plurality of stages is arranged to selectively provide the substantial movement velocity in the first directional component for the first one or more stages and no substantial movement velocity in the first directional component for the second one or more stages, wherein said no substantial movement velocity is no more than about 0.1% of the maximum movement velocity.

14. The system of claim 13, wherein the at least one tooth is selected from the group consisting of an upper incisor, a lower incisor, a canine, an upper anterior tooth and a lower anterior and the substantial movement velocity is within a range from about 0.1 mm per week to about 0.4 mm per week.

15. The system of claim 13, wherein the least one tooth is selected from the group consisting of molars and premolars and the substantial movement velocity is within a range from about 0.02 mm per week to about 0.25 mm per week.

16. The system of claim 1, wherein the first directional component comprises a directional component for a crown of the at least one tooth, and wherein the second directional component comprises a directional component for a root of the at least one tooth.

* * * * *